US008520888B2

(12) United States Patent
Spitzig et al.

(10) Patent No.: US 8,520,888 B2
(45) Date of Patent: Aug. 27, 2013

(54) APPARATUS, METHOD AND PROGRAMMABLE PRODUCT FOR IDENTIFICATION OF A DOCUMENT WITH FEATURE ANALYSIS

(75) Inventors: Roger Spitzig, Ontario (CA); Walter S. Conard, Lake Villa, IL (US); Leondo R. Phifer, Chicago Heights, IL (US)

(73) Assignee: Bell and Howell, LLC, Durham, NC (US)

( * ) Notice: Subject to any disclaimer, the term of this patent is extended or adjusted under 35 U.S.C. 154(b) by 841 days.

(21) Appl. No.: 12/149,024

(22) Filed: Apr. 25, 2008

(65) Prior Publication Data
US 2010/0027834 A1 Feb. 4, 2010

Related U.S. Application Data

(60) Provisional application No. 60/908,000, filed on Apr. 26, 2007, provisional application No. 60/951,640, filed on Jul. 24, 2007, provisional application No. 60/980,621, filed on Oct. 17, 2007.

(51) Int. Cl.
*G06K 9/00* (2006.01)

(52) U.S. Cl.
USPC .............................. 382/100; 382/176; 356/71

(58) Field of Classification Search
USPC .................................. 382/100, 218, 115, 116
See application file for complete search history.

(56) References Cited

U.S. PATENT DOCUMENTS

| | | | |
|---|---|---|---|
| 5,034,985 A | 7/1991 | Keough | |
| 5,204,681 A | 4/1993 | Greene | |
| 5,291,205 A | 3/1994 | Greene | |
| 5,581,257 A | 12/1996 | Greene et al. | |
| 5,673,338 A | 9/1997 | Denenberg et al. | |
| 5,690,774 A | 11/1997 | Greene | |
| 5,891,240 A | 4/1999 | Greene | |
| 5,956,414 A | 9/1999 | Grueninger | |
| 6,170,744 B1 | 1/2001 | Lee et al. | |
| 6,230,143 B1 | 5/2001 | Simons et al. | |
| 6,471,878 B1 | 10/2002 | Greene et al. | |
| 7,231,082 B2 | 6/2007 | Lenoir | |
| 7,236,617 B1 * | 6/2007 | Yau et al. | 382/125 |
| 7,356,162 B2 | 4/2008 | Caillon | |
| 7,415,130 B1 | 8/2008 | Rundle et al. | |

(Continued)

FOREIGN PATENT DOCUMENTS

EP 0 459 792 A 12/1991
EP 0 525 427 A 2/1993

(Continued)

OTHER PUBLICATIONS

European Search Report issued in European Patent Application No. EP 08008024.5 dated Jan. 16, 2009.

(Continued)

*Primary Examiner* — Shefali Goradia

(74) *Attorney, Agent, or Firm* — McDermott Will & Emery LLP

(57) ABSTRACT

The present application relates to a method, apparatus and programmable product for uniquely identifying a document. More specifically, the application allows for the identification of the document through collection of minutiae data at various points throughout the document's lifecycle without reliance upon or requirement for any unique identification characters, barcodes and/or objects that were added to the document specifically for the purpose of identification.

25 Claims, 14 Drawing Sheets

(56) References Cited

U.S. PATENT DOCUMENTS

| | | | |
|---|---|---|---|
| 7,489,807 B2 * | 2/2009 | Hwang et al. | 382/124 |
| 7,856,116 B2 * | 12/2010 | Rodriguez et al. | 382/100 |
| 2003/0138128 A1 | 7/2003 | Rhoads | |
| 2004/0094723 A1 | 5/2004 | Walker | |
| 2004/0255116 A1 | 12/2004 | Hane et al. | |
| 2005/0049744 A1 | 3/2005 | Mayer | |
| 2005/0063562 A1 * | 3/2005 | Brunk et al. | 382/100 |
| 2005/0069179 A1 | 3/2005 | Hwang et al. | |
| 2005/0123170 A1 | 6/2005 | Desprez et al. | |
| 2006/0108266 A1 | 5/2006 | Bowers et al. | |
| 2006/0159345 A1 | 7/2006 | Clary et al. | |
| 2007/0036470 A1 | 2/2007 | Piersol et al. | |
| 2007/0036599 A1 | 2/2007 | Piersol et al. | |
| 2007/0240198 A1 * | 10/2007 | Kander et al. | 726/2 |
| 2008/0002243 A1 | 1/2008 | Cowburn | |
| 2009/0218401 A1 | 9/2009 | Moran et al. | |

FOREIGN PATENT DOCUMENTS

| | | | |
|---|---|---|---|
| EP | 0 700 853 A | | 3/1996 |
| EP | 0 804 974 A | | 11/1997 |
| EP | 1 953 703 A | | 8/2008 |
| EP | 1 986 131 A2 | | 10/2008 |
| GB | 2 417 074 A | | 2/2006 |
| WO | WO 2007/012814 A | | 2/2007 |
| WO | WO 2007/028799 A | | 3/2007 |

OTHER PUBLICATIONS

European Search Report issued in European Patent Application No. EP 08008029.4 dated Jan. 21, 2009.

European Search Report issued in European Patent Application No. EP 08008025.2 dated Dec. 10, 2008.

Doermann, David, "The Indexing and Retrieval of Document Images: A Survey," Computer Vision and Image Understanding, Academic Press, US, vol. 70, No. 3, Jun. 1, 1998, pp. 287-298.

Agam, G. et al., "Content-Based Document image Retrieval in Complex Document Collections," Document Recognition and Retrieval XIV, vol. 6500, Jan. 28, 2007, pp. 1-12, XP002509272.

European Office Action issued in European Patent Application No. EP 08 008 024.5-2218 dated Dec. 10, 2009.

European Office Action and Search Report issued in European Patent Application No. EP 08008029.4-2218 dated Feb. 18, 2009.

Canadian Office Action issued in Canadian Patent Application No. 2,630,139 dated Jul. 20, 2011.

United States Office Action issued in U.S. Appl. No. 12/149,044 on Feb. 22, 2012.

United States Office Action issued in U.S. Appl. No. 12/149,043 on Nov. 17, 2011.

United States Office Action issued in U.S. Appl. No. 12/149,044 mailed Nov. 16, 2012.

United States Office Action issued in U.S. Appl. No. 12/149,043 dated Feb. 1, 2013.

European Communication issued in European Patent Application No. 08008024.5 dated Dec. 18, 2012.

U.S. Office Action issued in U.S. Appl. No. 12/149,044 dated Apr. 12, 2013.

* cited by examiner

APPARATUS, METHOD AND PROGRAMMABLE PRODUCT FOR IDENTIFICATION OF A DOCUMENT WITH FEATURE ANALYSIS

RELATED APPLICATIONS

This application claims the benefit of U.S. Provisional Application No. 60/908,000, filed Apr. 26, 2007 entitled "Apparatus, Method and Program Product for Identification of a Document with Feature Analysis;" U.S. Provisional Application No. 60/951,640, filed Jul. 24, 2007 entitled "Document Processing System Control Using Document Feature Analysis for Identification" and U.S. Provisional Application No. 60/980,621, filed Oct. 17, 2007 entitled "Method and Programmable Product for Unique Document Identification Using Stock and Content," the disclosures of which also are entirely incorporated herein by reference.

FIELD OF THE INVENTION

The present subject matter relates to a method, apparatus and programmable product for uniquely identifying a document, and more specifically, identifying the document throughout its lifecycle without reliance upon or requirement for any unique identification characters, barcodes and/or objects that were added to the document specifically for the purpose of identification.

BACKGROUND

The concept behind human fingerprint identification and analysis is to examine the characteristics of a fingerprint in order to identify its unique attributes. In translating the physical print into unique recognition data by an analysis tool 100 (e.g., high resolution imaging device) which may be subsequently stored, various data points called minutiae are gathered, such as depicted in FIG. 2. Traditionally, uniqueness of a physical fingerprint was identified via the magnification of an image of the print 102 and visual analysis of characteristics of the magnified print. Minutiae is essentially data representative of elements of interest. When one considers that no two fingerprints are identical, it is thus so that no sets of fingerprint minutiae points are alike. Minutiae may be compiled in various ways, such as two-dimensional coordinates representative of specific elements of interest 106, as a function of the relative distances between select elements of interest, as a function of relative angular measurements between select elements of interest, etc. Such information, in compilation, may be associated with a unique identification tag 108 as being representative of a sole individual. Hence, the statistical probability of duplicate fingerprints, and therefore duplicate sets minutiae data, is so astronomically high as to be considered virtually impossible—even for identical twins.

The number and location elements of interest for compiling the minutiae vary from finger to finger and from person to person for any particular finger (for example, a person's left thumb versus their right). When a set of fingerprint images is obtained from an individual, the data number for a minutiae is recorded for each finger. The precise locations of the minutiae are also recorded in the form of numerical coordinates for each finger. Other minutiae data may also be collected and associated with the fingerprint image, such as scar tissue data or the like for distinct identification purposes. The result is the generation of a function based on the compilation of this minutiae data that can be entered and stored in a computer database. Having acquired this data, a computer can rapidly compare this functional data against any previously stored fingerprint data in order to potentially link to an original source.

Unlike fingerprint analysis, where inherently unique aspects of a physical fingerprint 100 are relied upon, most document identification methods involve the decoding of, or recognition of physical content or markings on the document as identification means. For example, in the mail processing industry, where postal authority rules and regulations must be adhered to in order to avoid mail fraud and enable postage discounts for mailers, document identification and recognition is critical. Usually, a postal authority, relies solely on a sequence number, barcode, postal ZIP Code or other physical marking selectively placed upon the mail article as a means of identifying it from other articles in a batch of mail and/or from among all mailpieces. Likewise, in many manufacturing or goods distribution industries where unique documentation (e.g., labels) is required to distinguish a particular good or manufacture, unique scancodes, item numbers or serial numbers are used. Even in the field of document forensics, which may involve the determination of signature forgery, mark authentication, writing indentations, smudge mark analysis, etc., there still is a dependency upon analysis of the content (characters and/or objects) i.e., object character recognition of that which is printed or written on the document.

Suffice to say, there is currently no system or method for enabling the complete identification of a document, especially throughout its lifecycle, based on the same principles that enable a fingerprint to be distinctly identified from all others. Because it is common for documents to be printed and/or copied such that they possess identical physical content or markings (e.g., charts, words, logos, letter head, etc.), there is a need in the art for a system and method for unique document identification and analysis enablement would require the generation of minutiae data that is not limited to or based solely upon such content or markings, such as a barcode or the like. Conventional techniques of adding unique identifiers to a document for later identification involves added expense. Furthermore, the there is a need in the art for a system that enables a client to easily gain access to relevant data pertaining to a document throughout its life cycle, on demand.

SUMMARY

The teachings herein alleviate one or more of the above noted problems by providing a method, apparatus and programmable product for document identification. The present teachings allow for unique identification a document, and more specifically, allow for the identification of the document through collection of minutiae data at various points throughout its lifecycle without reliance upon or requirement for any unique identification characters, barcodes and/or objects that were added to the document specifically for the purpose of identification.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 2:
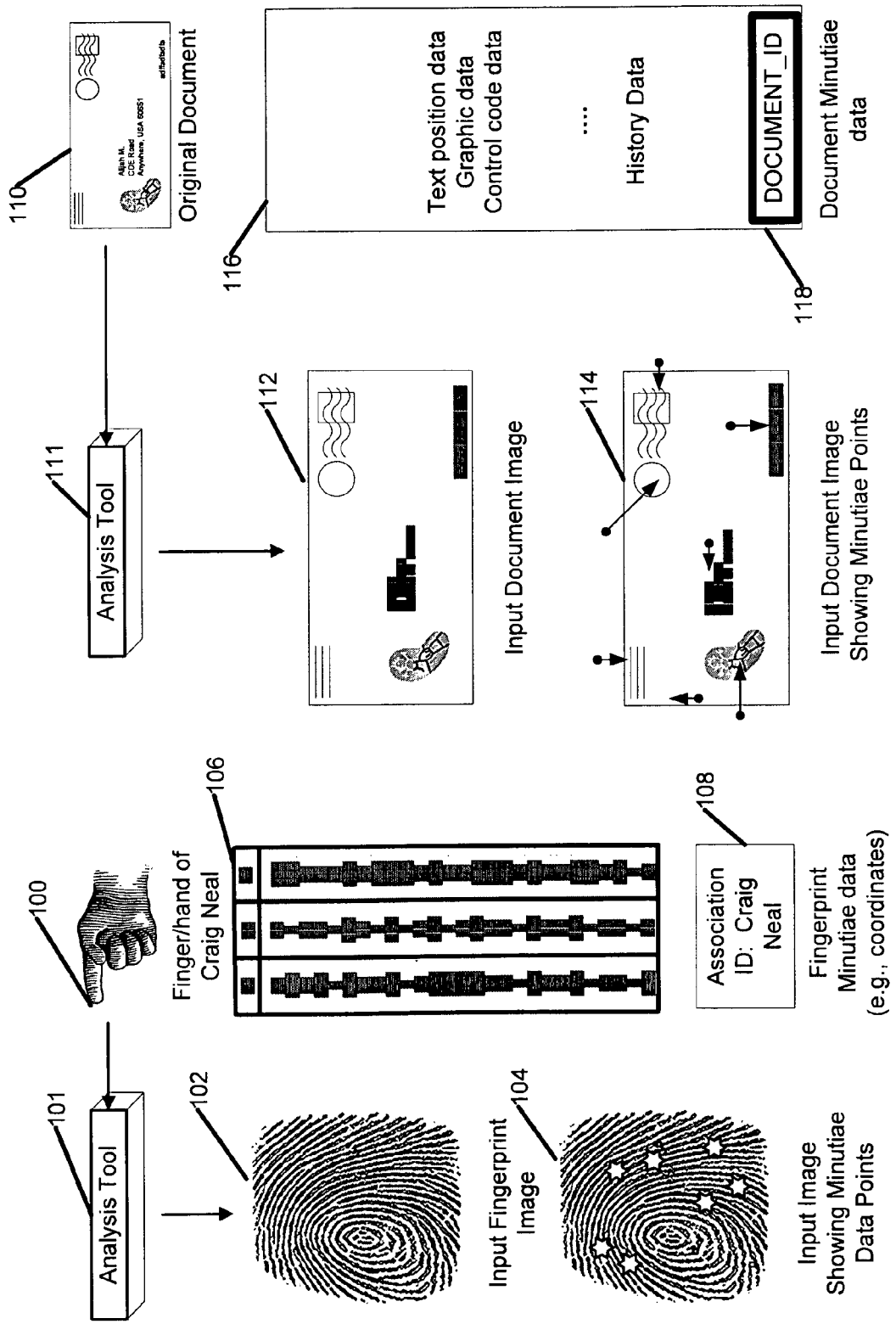
FIG. 2 is an exemplary depiction of a unique identification process being generated for a document in contrast to a fingerprint identification for a fingerprint.

The teachings presented herein pertain to the collection of minutiae data at various points throughout the life cycle of a document for the purpose of generating and cultivating a unique document identification value associated with said minutiae data. Furthermore, the teachings pertain to the identification of documents throughout its lifecycle based on its associated document identification value. The document identification value may be generated as a function of the compilation of said collected minutiae data, such that the assignment of the identification value is unique to only that document. Alternatively, the document identification value may be assigned uniquely by a minutiae data processing module or computing device. As a mere example, and not by way of limitation, with respect to FIG. 2, the teachings herein contemplate that analysis tools 111 may be used to process a document 110 for the purpose of identifying characteristics that distinguish it from countless other documents in a manner similar to that performed for distinguishing a fingerprint 100 from countless other possibilities.

With this in mind, those skilled in the art will recognize that an image of the document 112 may be analyzed using resolution imaging and magnification techniques to reveal unique document minutiae data points characteristic of the original document 110, as shown by image 114. In a manner similar to an image of a human fingerprint 104, this document minutiae data may be compiled and stored into a data structure 116, possibly even including metadata associated with the document, and then associated with a unique document identification value 118. The value assigned would be based at least in part on the document minutiae data collected initially, while subsequent minutiae data may be added at future points of processing of the document. Suffice to say, the ability to associate a unique identification value to a data structure inclusive of minutiae data and possibly metadata, provides a convenient means for which to distinguish a document from a myriad of possibilities. Furthermore, as will become apparent to those skilled in the art, the ability to persistently maintain updated minutiae data respective to a document by association of its unique document identification value, provides a means of document tracking and use logistics compilation. The document identification value 118 is required to uniquely identify the computer record that contains minutiae data associated with document being processed. Numerous techniques are available to those skilled in the art to assign a unique document ID that is not based on the contents of the data file.

Generally speaking, metadata is data about data. As described herein, "metadata" may refer to any information that reveals the context and/or characteristics of other data (e.g., data structures, objects)—how, when or by whom a particular set of data was collected, or how the data is formatted. This may include the compilation or encoding of information about data, such as a document, that aids in the discovery, assessment, history and management of the data. From a systems perspective, metadata compiled in association with system generated data is known for providing a means of recognizing and describing all aspects of said system: data, activities, people and organizations involved, locations of data and processes, access methods, limitations, timing and events, as well as intended utilization and rules with govern use of the metadata. In general, metadata can be classified in three distinct ways: (1) By content, wherein the metadata can either describe the resource itself (for example, name and size of a file) or the content of the resource (for example, "This video shows a boy playing football"), (2) by mutability, wherein with respect to the data comprising a resource (e.g., a video file), metadata can be either immutable (for example, the "Title" of a video does not change as the video itself is being played) or mutable (the "Scene description" does change), or (3) by logical function, wherein the intent or logical reasoning underlying the structure of the data is described. Hence, document metadata is used in a general context to refer to any data that is stored about the document that has been "fingerprinted" (associated with a unique document identification value) as compared to minutiae which is used for document identification. Indeed, those skilled in the art will recognize that many variations of metadata schemas exist, including but not limited to Dublin Core, AACR2 (Anglo-American Cataloging Rules) and GILS (Government Information Locator Service). The teachings herein are therefore not limited to any particular implementation.

As described with respect to the teachings presented herein, "minutiae data" may refer to any data representative of or descriptive of the physical or structural elements that define, characterize, or distinguish one document from another. However, for document fingerprinting, minutiae data is not necessary limited to data regarding specific elements of interest on the document. By physical, it is meant the orientation, style, placement, appearance and other such features that influence the appearance of the document. On the other hand, structural elements refer to the internal characteristics and composure of the paper or other medium upon which the document is produced. Minutiae data may include data generated, associated or conveyed during and throughout the life cycle of the document, including but not limited to data expressed or created during the time of document creation, definition, edition, versioning, formatting, importation/exportation, storing/purging, printing, viewing/reviewing, conversion, print adaptation, transmission/receipt, reproduction (e.g., photocopying, scanning, imaging), and physical manipulation. More specifically, the minutiae data may be compiled and associated with metadata. When compiled individually or in concert with other information (e.g., metadata), the minutiae data may provide a persistent data record that may be retrieved as a function of the unique physical, structural and/or contextual elements associated with a document. No one minutiae item is sufficient for unique identification of a document, but rather, it is the collection of numerous matching minutiae that enables the unambiguous identification of a document. For this reason, those skilled in the art will recognize that minutiae data may be expanded during the document's lifecycle.

Figure 1:
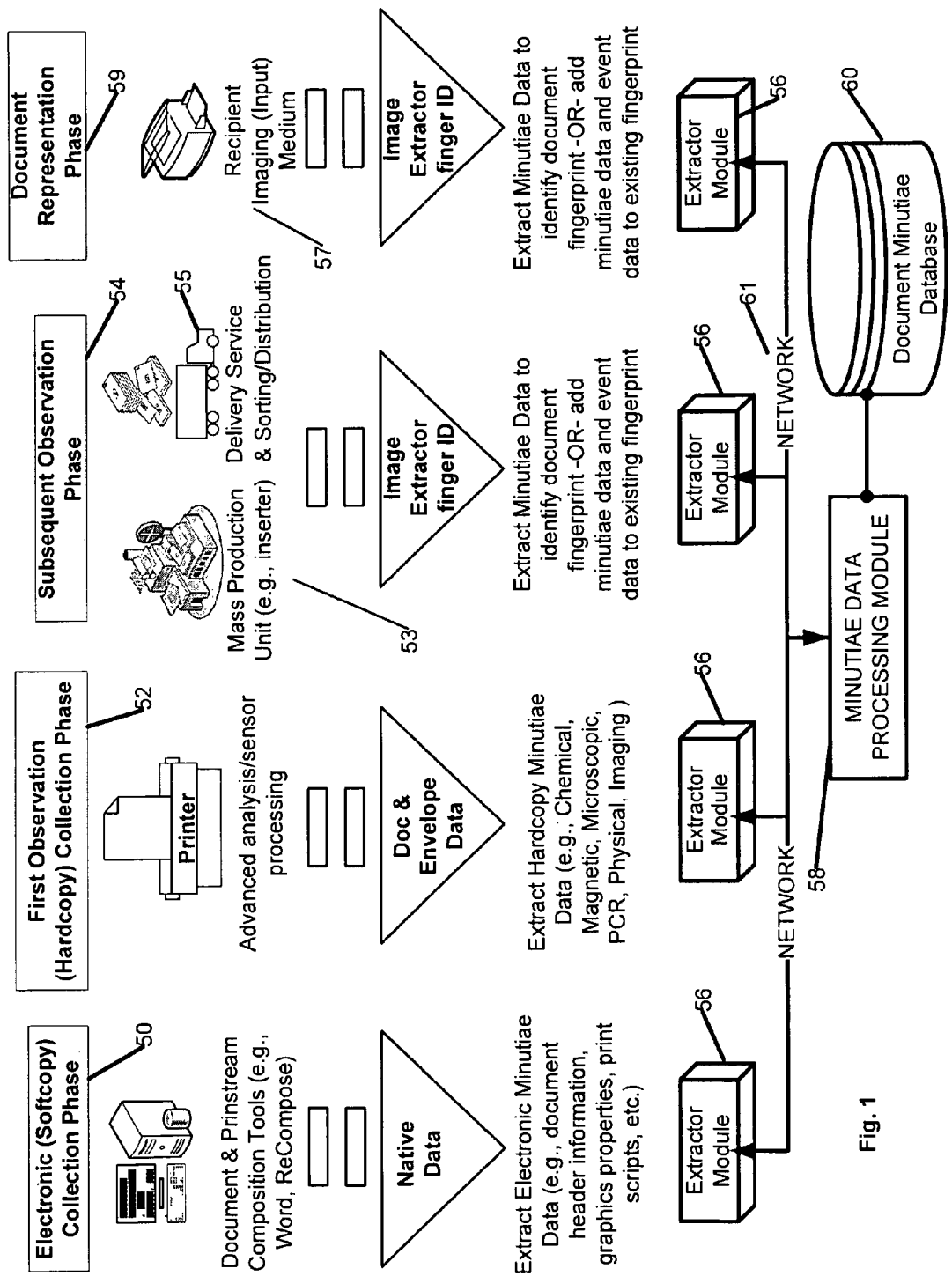
FIG. 1 is an exemplary depiction of the various phases of data extraction of a document.

In FIG. 1, an exemplary depiction of the primary phases of processing of a document wherein the aforementioned characteristic data may be obtained in accordance with the teachings and principles herein are shown. Namely, each phase represents the different phases of the document life cycle, expressed herein as the electronic (softcopy) collection phase 50, the first observation (hardcopy) collection phase 52, the subsequent observation phase 54, and the document representation phase 59. The first phase 50 corresponds generally to the electronic or data realm of activity of document processing, while the second phase 52 corresponds to periods of analysis after rendering the document to a physical medium. By first observation collection 52, it is meant that initial moments of analysis and data collection/extraction of a hardcopy version of the document may be performed. The subsequent observation/collection phase 54 corresponds to moments of data collection/extraction, subsequent analysis and document identification beyond the initial printing phase. Generally, this may occur as the document is distributed throughout a mail processing facility 53 or postal network 55, or as the document is processed by a recipient 57. The last processing phase 59 represents post-delivery of the document, wherein the physical document is capable of being represented electronically by one or more electronic representation mediums (e.g., scanner device). More about these environments will be presented with respect to the teachings later on in the detailed description.

Data processing—i.e., minutiae or metadata collection—at each phase is performed by an extractor module 56, an executable module integrated with and/or communicable with a process, device or utility (e.g., software, hardware, or firmware processes or tools) capable of operating during the time of a respective phase. The extractor module 56 operates to extract, acquire, and/or convey data in different ways depending on the corresponding phase of data processing 50, 52, 54, 59 of the document. Moreover, the extractor module 56 is deployable for independent operation upon the various devices or utilities usable during the electronic collection phase 50, first observation collection phase 52, subsequent observation phase 54, or document representation phase 59 while enabling network 61 communication. In this way, the modules may relay information to each other if necessary and/or communicate with a document minutiae data assessment module 58. In addition, the extractor module 56 may also communicate with the particular device, tool (e.g., software) or process it is operating in association with during a respective document processing phase 50, 52, 54, 59 such as to provide tracking information or ID notification data.

The document minutiae data processing module 58 is a device (e.g., server), executable module or process that analyzes document minutiae data provided by an extractor module 56 in the form of a data structure. In other instances, the document minutiae processing module 58 communicates relevant information pertaining to a document to the extractor module 56. In general, the minutiae data processing module processes the various fields of the data structure in order to access the data contents therein, and then executes one or more of the following actions based on the data: (1) compare the document minutiae data received against existing document minutiae data stored to a document minutiae database 60 to determine if it is associated with a particular document identification value, and (2) assign a unique document identification value based upon the received document minutiae data or other data processing function that produces a unique file identification and document ID. More details regarding the behavior and function of the document minutiae processing module 58 and its interaction with the extractor module 56 will be described in later paragraphs. Suffice to say, when and extractor module 56 is integrated with a document processing medium (e.g., a printer, document authoring software, high-speed inserter device), printstream management medium (e.g., printstream creation software) or analysis tool (e.g., imaging device, spectrometer) that operates upon the document during its lifecycle, the extractor module 56 may access key information representative of the unique elements and features of the document.

The initial phase of document lifecycle data processing, referred to as the electronic (softcopy) collection phase 50, corresponds to minutiae generation and collection at the point and time of document composition and/or printstream composition. Document composition (and in some instances, printstream composition) refers to instances wherein a document is generated, designed and/or altered via electronic data processing means, i.e., a document composition tool, such that the resultant output is at least an electronic (softcopy) representation of the document as structured in accordance with a specific file format (e.g., *.doc, *.txt, *.html, *.dat). During an instance of document composition, various types of objects and/or characters may be associated with the document via a document composition tool to comprise the human or machine readable content or message of the document. Ultimately, during the electronic collection phase 50, any instance of a document in softcopy form—whether the document has been stored to a storage medium or not—is suitable for exposing document minutiae data capable of being collected by an extractor module 56.

Examples of document composition tools which may be employed during the electronic collection phase 50 include, but are not limited to, word processing software such as Microsoft Word and Word Perfect, desktop and web publishing software such as Framemaker, Dreamweaver and WebPlus, and image creation software tools such as CorelDRAW or Photoshop. In general, software applications such as these provide a WYSIWYG (What You See Is What You Get) interface for enabling advanced content authoring capability to the user without exposing via the user interface the underlying schema elements and semantic variables that comprise the document (e.g., metadata, data tags, delimiter values). Many proprietary composition tools also are available and used by those skilled in the art to compose a document. So, for example, in Microsoft Word, when a user types the word "Legacy" in bold, the interface doesn't display any data tags indicative of the style, character, format, type or definition of this user entry (e.g., <bold>Legacy</bold>), but rather only shows Legacy.

Other document authoring, generation or composition tools from which document data may be extracted include those that are text based (e.g., Text Editor, Notepad) and WYSIWYM (What You See Is What You Mean) based (e.g., Butterfly XML), wherein the various schema elements and/or semantic variables that enable the structure of the document and its content are presented to the user interface directly. As a practical matter, other document creation tools include any software or operating systems capable of rendering characters and/or objects to a user display, or wherein said characters and/or objects are capable of being rendered to print. For example, when a user creates a representation of the current state of their desktop via the Print Screen function of their keyboard, the captured image data is stored to a electronic buffer space (e.g., the clipboard, a file) and represents an instance of document composition and/or printstream composition.

Regardless of the type of document authoring tools employed—be it those described above, hardware based, or firmware based—those skilled in the art will appreciate that the schema elements and semantic data (e.g., meta tags, document type definitions, etc.) that define the document may be exposed and/or acquired for analysis. Still further, those skilled in the art will recognize that the teachings are not limited to any particular type of semantic data, markup language, data serialization format, syntax, schema or the like, as indeed various types may be employed, including but not limited to: Extensible Markup Language (XML), Hypertext Markup Language (HTML), Standard Generalized Markup Language (SGML), JavaScript Object Notation (JSON), Ordered Graph Data Language (OGDL, AsciiDoc, REBOL, and other such languages executable by various programming parsers (e.g., PERL, C++, JAVA). The extractor module 56 may be integrated with the document composition medium as an executable module (e.g., DLL—dynamic link library) having the appropriate functions and interface accesses for perceiving and recording the data expressed during document creation. Indeed, the extractor module 56 may also perceive and record data exchanges between multiple other dynamic link libraries as they interact in connection with the document creation tool.

Similarly, printstream composition tools may also be employed during the electronic collection phase 50. In general, printstream composition refers to instances wherein a softcopy representation of a document is translated into a specific printstream format, such that the resultant output is at least a print file representative of the document as structured in accordance with a specific print file format. Various types of print file formats are well known in the art for enabling the communication of a softcopy representation of a document with a printing device, including but not limited to: postscript, SOLscript, variable postscript (VPS), VIPP, Metacode, Advanced Function Presentation (AFP), Printer Control Language (PCL), enhanced metafile (EMF) or Hewlett Packard Graphics Language (HPGL). During an instance of printstream composition, the softcopy representation of the document is engaged in conversion to a respective print file format. The print file, representative of the respective print stream, may include instructions for regulating and controlling the behavior of the printer device—i.e., ink head spray pattern.

Alternatively, printstream composition may refer to instances wherein existing printstream data, i.e., one or more print files, are manipulated or restructured to alter the expected document output from the printing device. In the former scenario, the document composition tool may employ one or more print drivers/modules or the like to achieve conversion or the print drivers/modules may process the softcopy document directly. In the latter scenario, various printstream composition techniques and tools may be employed for manipulating, merging, or converting existing printstream data, including but not limited to: Presort Accuracy, Validation, and Evaluation (PAVE) via Mail Manager 2010™ by BCC Software, or Print Stream Optimization and ReCompose via the BÖWE One™ software suite provided by Böwe Bell+Howell Company. Other printstream composition techniques and tools may include those for performing print file splitting, document re-engineering, print file data extraction, document indexing, etc. Also, various techniques exist for converting from one standard print file to another (e.g., conversion from an Enhanced Metafile to a Windows metafile). It is not uncommon for printstream composition to occur in parallel with the document composition process depending on the type of operating system being utilized to compose the document. Indeed, during the electronic collection phase 50, any instance of printstream composition—whether for application within a mail processing environment or not—is suitable for exposing document minutiae data capable of being collected by an extractor module 56.

Still further, in the mail processing industry, a data center processor may be used to compose documents destined for operation by a mail processing device, such as an inserter. Data center processors typically enable document and/or printstream composition to commence, and alternatively, the manipulation of such data. In association with the document created by the data center processor may be one or more machine processing device control settings (e.g., inserter data file (IDF).

Figure 3:
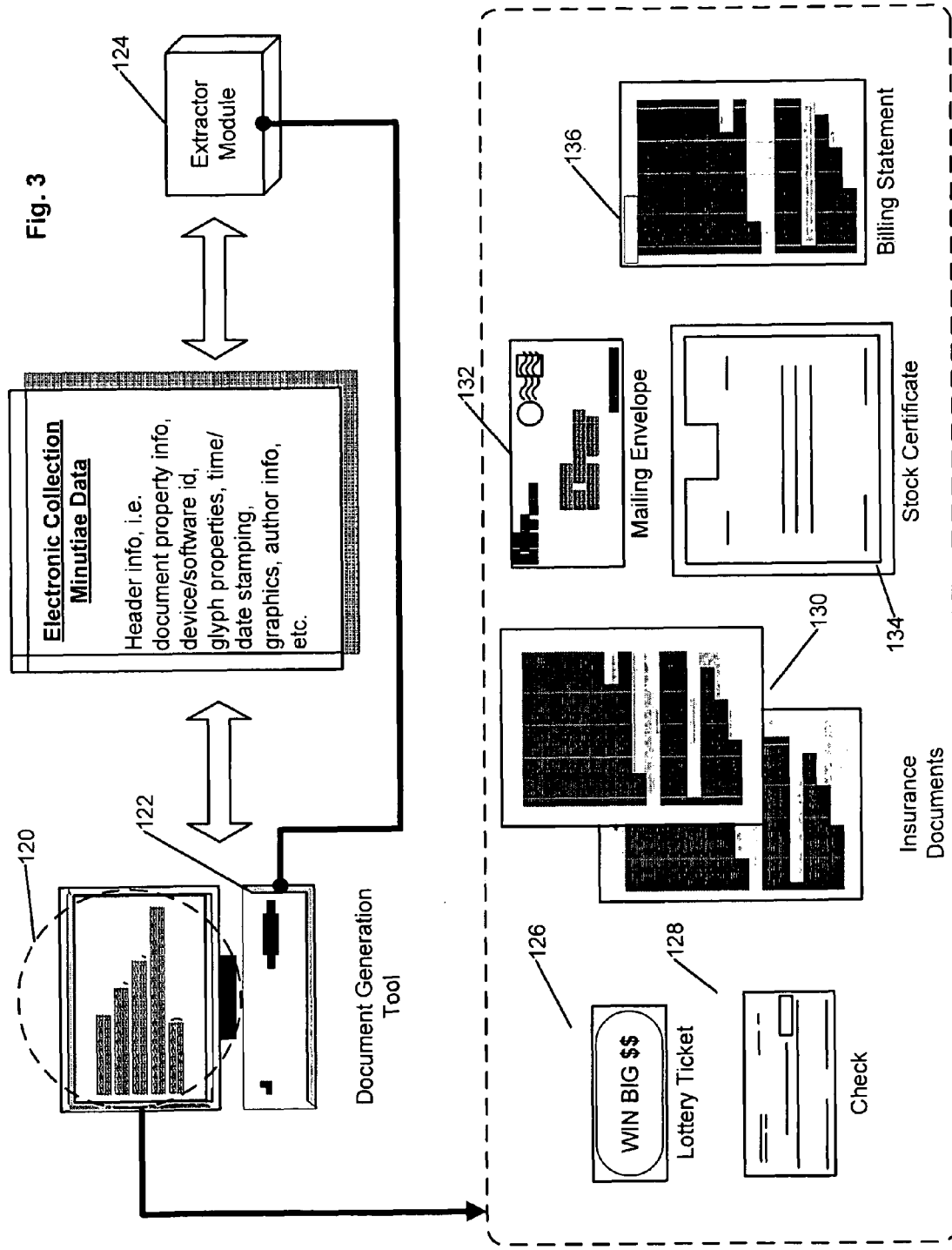
FIG. 3 is an exemplary depiction of the various phases of data extraction of a document.

With reference now to FIG. 3, an exemplary depiction of document minutiae gathering during the electronic phase 50 of data collection/extraction is shown. In particular, a document composition tool 120, such as a document authoring software application or word processor, is capable of operating upon a computing device 122. Various types of documents may be composed using the document composition tool, including but not limited to documents destined for print press production and high speed printing devices such as lottery tickets 126, insurance documents 130, stock certificates 134, billing statements, checks 128 and mailing envelopes 132. Some of these exemplary documents have commercial or industrial applications, while others may be generated in consumer environments. Regardless of what entity composes such documents, each of these documents represents those which are specific to a particular individual or recipient. As shown by these examples, even in the absence of tools to interpret the physical content of such documents there are many applications in which, the ability to distinguish between a myriad of such documents may be critical.

Also, operating in concurrence with the document composition tool 120 and/or computer device 122 is an extractor module, which may run as a background process at times of document composition and/or printstream composition. The document composition tool 120, which generally includes a representative user interface (device context) for presenting an electronic depiction of a document, enables a user to associate various graphics primitives and characters such as text, symbols, etc. having various defined properties (font types, font styles, font sizes, spacing characteristics, glyph characteristics, line styles, etc.) with the document. In addition, the user may also associate with the document various objects such as images, graphs, charts, financial metrics, color backgrounds, etc. During document composition and/ or printstream composition, select document minutiae data_may be collected by the extractor module 124 and stored into a retrievable data structure 123 for subsequent retrieval. Document minutiae data collected during the electronic collection phase 50 may include, but is not limited to: word count per page or per the entire document, tab spacing and indentation lengths, margin lengths, paragraph numbers, header/footer locations, image locations, line numbers, line spacing, character and/or font spacing, number of characters with and without spaces, textual color properties, text strings and characters, white space total area data, document size, and other such data useful for defining and influencing the physical appearance of the document when rendered to its hardcopy/printed form. The minutiae data may also include content information, such as specific text, phrases, numbers, or combinations thereof where no single grouping of text, phrases or numbers is sufficient for document identification nor were these items added to the document for the purpose of identification.

Also, in association with the document minutiae data, the extractor module 124 may compile metadata information relative to the document and/or printstream being composed. An exemplary metadata structure, along with an explanation of the meaning of the various element types comprising it, is shown in TABLE 1 below.

TABLE 1

Exemplary metadata file/structure

| Element Name | Value | Meaning |
|---|---|---|
| Document Title | College Thesis | Title of document as assigned by a user of the composition tool to a storage medium |
| Creator | Naiomi Maati Wells | Name of entity/author responsible for authoring and/or generating the document |
| Publisher | Harvard University Library | Name of entity responsible for publishing the document |
| Identifier | http://www.naiomi.com/college-thesis.html | Machine ID, User ID, Network ID, URL, Resource ID, or other form of ID value. |
| Format | Text/html | Document composition format type |
| Relation | Library Web site | Usage information |
| Event | Date of last creation, modification, storage, access or print; revision data; storage location data; edition data | Temporal, history or event based information |
| Function | Macro name = "My_Thesis_Objective" | Function, script, instruction or executable code information (e.g., location data) |

Metadata may be encoded semantically into the document being composed through the usage of META tags. An example of this in the context of the HTML syntax is shown below:

<META NAME="Creator" CONTENT="Wells, Naiomi Maati">

Alternatively, metadata may be stored in a separate file or database that is linked to the document or printstream being composed. Of course, those skilled in the art will recognize that other elements, including custom elements, may be stored as metadata. In addition, references to additional resource data may also be stored as metadata. For instance, in a mail processing environment, machine and document control setting information may be utilized to control how an inserter handles a composed document. These settings may be established during document composition, such as by the data center processor, and stored as a control settings file. Settings may include document folding or cutting instructions, instructions on which inserts to select for inclusion in an envelope along with the document, document arrangement instructions (e.g., to control the sequence in which inserts or pages of the document are placed), labeling instructions, printer instructions. The name of the control settings file conveying this information, its whereabouts, its source of origination—some reference to the information—can be saved as metadata for subsequent referenced. Indeed, any metadata that aids in perceiving the context of the acquired document—i.e., its identification, discovery, assessment, function, location, history, and management—is within the scope of the present teachings.

The extractor module 124 (FIG. 3) may perform a persistent or periodic aggregation of the above described metadata by accessing the metadata file, or decoding the META tag syntactical references during document and/or printstream composition. Moreover, the extractor module 124 may perform a persistent or periodic aggregation of the minutiae data by interpreting the application programming interface (API) function calls and/or object library instructions called during document composition or printstream composition. Alternatively, the extractor module 124 may directly invoke various function calls associated with the API as applied by the document composition tool for retrieving the various semantic variables that influence the physical characteristics and layout of data for the document (content, layout, margins, text features).

For example, the Windows operating system takes advantage of a graphics device interface (GDI), a type of API which provides functions and related structures that a document composition or printstream composition application can use to generate graphical output for displays, printers, and other devices. Using GDI functions, the document composition tool can draw lines, curves, closed figures, paths, text, and bitmap images, intended for comprising the content of the document, as well as define how said information is arranged and/or formatted. The functions that enable formatting include those for retrieving or setting the text-formatting attributes of a document, those for retrieving or setting the character widths, and those for retrieving or setting string widths and heights. An exemplary means by which the extractor module 124 may access the document minutiae data during document composition and/or printstream composition is to invoke the various retrieval functions associated with the API—i.e., retrieve text color data of a text string by calling the GetTextColor function, retrieve the current background color for a text string by calling the GetBkColor function, retrieve actual character-width or spacing data by using the GetCharABCWidths and GetCharABCWidthsFloat functions, or retrieve the physical dimensions of any font to be embedded within the document by calling the GetTextMetrics function. Text information oriented at specific coordinates, regions-of-interest (ROI) (i.e., text information located within a particular range of coordinates) or locations upon a document may also be retrieved without necessarily decoding or interpreting the text itself.

Similarly, the same above described document minutiae data may be retrieved from analysis and interpretation of printstream data (e.g., a print file representative of the document) during printstream composition—which may occur in parallel with document composition. For example, an enhanced metafile (EMF) is a print device independent print file format (supports all device driver types) used to record the text output commands, text formatting attributes, a semantic variables that were associated with the document via the GDI function calls made by the document composition tool 120. Each time the document composition tool 120 calls one of the above described GDI drawing functions, one or more new EMF records are created and stored in the print file representative of the document. Elements of the EMF include a header, a table of handles to GDI objects (e.g., SetTextColor, SetTextMetrics), a private palette, and an array of metafile records. Hence, the extractor module 124 may read the print file (e.g., the EMF), identify those specific references or variables that influence the physical characteristics of the document (e.g., tab spacing and indentation lengths, margin lengths, character and/or font spacing, number of characters with and without spaces, textual color properties, text or image coordinate data), and store such data as document minutiae data 123.

It will be recognized by those skilled in the art that compiling document minutiae data representative of the physical characteristics of the document in association with metadata descriptive of the context of the document and/or printstream composed, provides key information unique to the document in question. Indeed, depending on processing requirements and environments, different combinations of such data may be specified for extraction by the extractor module 124. For example, the extractor module 124 may be programmed to seek only five specific minutiae data elements of interest in characterizing a document that is intended for a single recipient. Exemplary elements of interest respective to the data comprising a document, say a credit card statement, may include but is not limited to, location, style, content, formatting and number of characters of an account number included as part of said credit card statement. In contrast, more minutiae data points may be compiled for a document intended for multiple users, such a form letter to be mailed out to thousands of different recipients. The same is true for the associated metadata, where only specific metadata elements of interest (e.g., machine ID+date and time of creation) may be compiled in combination with the minutiae data, while avoiding the collection of less relevant metadata. Customization of this nature will be appreciated by those skilled in the art, as the extractor modules 124 may be adapted to fit a particular environment, organization, or user in which it may be deployed, while still maintaining a consistent data collection standard; the standard of extracting only minutiae data useful for influencing or representing the physical and structural characteristics of the document, and metadata useful for perceiving the context of the acquired document—i.e., its identification, discovery, assessment, function, history, and management. The same minutiae features that are extracted from the electronic versions of the documents can also be extracted from an image of the hardcopy document. It is the comparison of these two sets of minutiae that forms the basis of fingerprint document identification.

Figure 4:
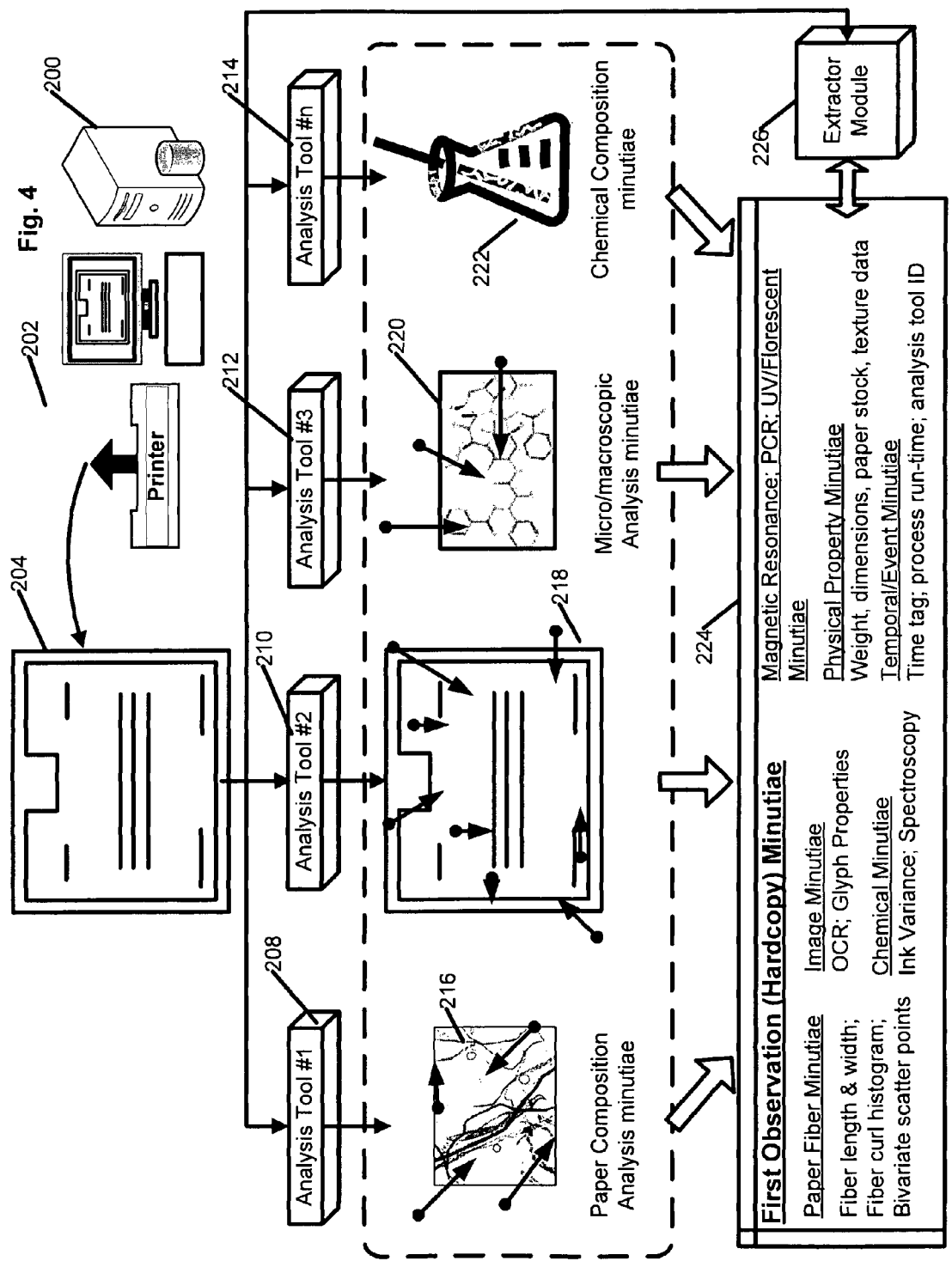
FIG. 4 is an exemplary depiction of minutiae gathering during the electronic phase of data extraction of a document.

Reference is now made to FIG. 4, which depicts the exemplary process of minutiae gathering during the first observation collection (hardcopy) phase of data extraction. As stated, this corresponds to the moment in the lifecycle of the document wherein it is rendered to a physical medium (e.g., paper) as opposed to maintained electronically (softcopy form), and initially processed for analysis by one or more analysis tools. More specifically, the first observation collection phase pertains to the first instance of analysis and data collection/extraction upon a hardcopy version of the document by a particular type of analysis tool. Hence, when documents such as the stock certificate 204 are printed from a computing device 200 by a printing device 202, various types of analysis tools may be employed for processing the document to obtain unique minutiae data. As a first type of analysis, a high resolution imaging device 208 may be used to perform a paper analysis 216 of the printed document. The paper analysis may include analysis of the fiber structure in high fiber content paper, analysis of the paper density that naturally occurs when the paper pulp is compressed, or analysis of paper textual features that may be intentionally introduced into the paper. In performing the analysis, the entire document may be analyzed, or alternatively, a specific region-of-interest of the document may be analyzed.

The latter increases the speed and efficiency of the analysis process, while the former increases the number of unique minutiae data points capable of being generated. However, those skilled in the art will appreciate that from an internal microscopic level of perception, even two documents appearing identical physically (e.g., same content, layout, formatting, typesetting) will differ greatly structurally even if compared against one another at a limited region-of-interest. As such, the analysis tool need only observe a limited sample of the document—i.e., analyze the rightmost bottom region of the document to within a rectangular region of 0.25×0.25 inches. Alternatively, the region-of-interest need not be symmetrical, but rather asymmetrical (e.g., a region enclosed by a freeform object) as defined by the operator of the analysis tool. In either way, restricting the fiber composition analysis to a smaller defined region-of-interest greatly increases the rate of processing of documents for performing such analysis, and enables feasibility of implementation within residential, commercial and industrial settings.

Pursuiant to the paper composition analysis within the region-of-interest, a high resolution image of the fibers or pulp concentrations comprising the document may be translated to reveal specific minutiae elements of interest. Minutiae data collected respective to the elements of interest may include, but is not limited to: number of distinct fibers perceivable within the ROI, length and width of select fibers, fiber curl histogram, bi-variate scatter point data, coordinate location of a select reference fiber, etc. In the case of pulp, minutiae data may include, but is not limited to, pulp density data or pulp type analysis. Using a paper and pulp analysis device, measurements of the fiber formation, area, length, breadth, perimeter, optical density, shape, and location of objects, done on a feature-specific basis, may also be captured as minutiae data. Such machines may also be capable of analyzing metallic, semi-conducting, and oxide materials and fibers embedded within the document having a conductive capacity (e.g., paper embedded with radio frequency identifier (RFID) materials). RFID is a broad field of technology covering material or devices that respond to radio frequency illumination. These devices may include but are not limited to active devices that radiate a result when interrogated or passive devices that re-radiate a result when illuminated, wherein the passive devices may include but are not limited to semiconductor devices, material deposited on a substrate, printed material or fibers contained in the paper. The minutiae data may be persistently stored by an extractor module 226 executable as compatible software/firmware upon the respective analysis tool 208 (e.g., image analysis machine) for collection of such data during the time of document analysis. This data may then be aggregated into a data structure 224 for subsequent retrieval. It will be seen later on that the data structure may be utilized in different ways to affect the behavior of the extractor module 226, and its interaction with the document minutiae processing module (not shown), depending on the data stored therein.

Another type of analysis of the document 204 during the first observation collection phase may be conducted using an imaging device 210. Exemplary imaging devices 210 for collecting minutiae data may include, but are not limited to, scanners, optical readers, cameras, copy machines, fax machines, etc. An image of the hardcopy document 112 may be analyzed using resolution imaging and magnification techniques to reveal unique document minutiae data points characteristic of the original document 110, as depicted with respect to the composite image 218. Document minutiae data collected during the electronic collection phase 50 by the extractor module 226 operating in association with the imaging device 210 may include, but is not limited to: word count per page or per the entire document, tab spacing and indentation lengths, margin lengths, paragraph numbers, header/footer locations, image locations, line numbers, line spacing, character and/or font spacing, number of characters with and without spaces, textual color properties, text string and character coordinate information, paper stock, paper type/dimensions, and other such data descriptive of the physical characteristics of the various objects and/or characters that appear on the hardcopy document. Also, in association with the document minutiae data, the extractor module 124 may compile metadata information created by the imaging device as it processes the document 218. As will be apparent to those skilled in the art, the minutiae data collected by imaging the hardcopy document to much an extent mirrors the minutiae data collected during the electronic collection phase 50. It will be seen later on that this is an intentional feature of the present example, for enabling advanced tracking and linking of the hardcopy version of a document to its original electronic representation and history data (via the assigned document identification value).

Other analysis tools and/or sensing devices may also contribute additional minutiae data associated with the document, including a microscopic imaging device 212 for generating micro/macroscopic minutiae data, and a chemical analysis tool 214 for generating chemical composition minutiae data. While the paper fiber composition minutiae data is based on analysis of the paper fibers comprising the document 204, micro/macroscopic minutiae data is based on more rigorous magnification of the document for boring deeper into the internal structure of the document. A scanning electron microscope (SEM) may be used to generate detailed molecular images, such as shown with respect to a captured image 220 representative of a select ROI of the envelope. Due to the manner in which the image is created, SEM images have a characteristic three-dimensional appearance and are useful for judging the surface structure of the sample in question (e.g., the document). Other forms of microscopic devices and/or techniques may also be employed including x-ray microscopy, and scanning acoustic microscopy (SAM). Chemical analysis may be performed for analysis of microscopic particles or regions within a sample region of interest of the document analyzed by the scanning electron microscope (SEM). Energy dispersive spectrometer (EDS) microanalysis may be performed by measuring the energy and intensity distribution of x-ray signals generated by a focused electron beam on the region of interest of the document. In this way, minutiae data representative of the micro and chemical elemental composition of materials can be obtained, along with any associated metadata generated by the respective analysis tools used. The metadata may reveal time stamp information, device or tool identification data, network identification information, and other data that may be useful for understanding the events/context of the document at that moment of its lifecycle.

Those skilled in the art will recognize that various other tools not expressly presented herein may also be utilized during the first observation minutiae collection phase 52 for characterizing the physical and structural qualities of the document. For example, OCR technology may be employed for interpreting the plurality of markings resident upon a document, where the results of the interpretation may be further employed as minutiae data. Such analysis may be employed on a case-by-case basis, however, given that no single marking is sufficient in and of itself to uniquely identify a document from amongst a myriad of possibilities (i.e., one out of a trillion of actively known or fingerprinted documents). The interpretation of a single element of content (e.g., words, text strings, barcodes) of a document does very little to enable one to identify a specific instance of a document against even numerous photocopied versions thereof having the same identical content. Indeed, practitioners of the art may employ their own suite of sensors or analysis tools for processing of documents in accordance with their own requirements. In an effort to further enhance data processing rates for the above described analysis tools 208, 210, 212 and 214, select minutiae data of interest need only be stored into the data structure 224. In particular, only the minutiae data most pertinent to characterizing the physical (e.g., text coordinates, word counts) and structural composition of the document (e.g., microscopic/macroscopic, fiber, chemical) within the region-of-interest need be compiled. Of course, the number of data points, measurements or calculations retained as minutiae data may be customized to fit specific processing environments, organizational capabilities or user needs. In this way, the analysis tools may be adapted accordingly to ensure higher scan rates, sampling speeds, timing settings, and signal processing for analysis of the samples under analysis.

The data structure 224 for aggregating the minutiae data may then be communicated via a network connection to the document minutiae processing module (not shown), which may reside locally in proximity to the analysis tool via a local server or at a remote server or location. Depending on the data conveyed to the document minutiae processing module, various actions may commence, including but not limited to: (1) associate the contents of the data structure with a newly assigned document minutiae identification value, or (2) associate the contents of the data structure with an existing document minutiae identification value. More regarding the activities and behavior of the document minutiae processing module will be described in later paragraphs.

Figure 5:
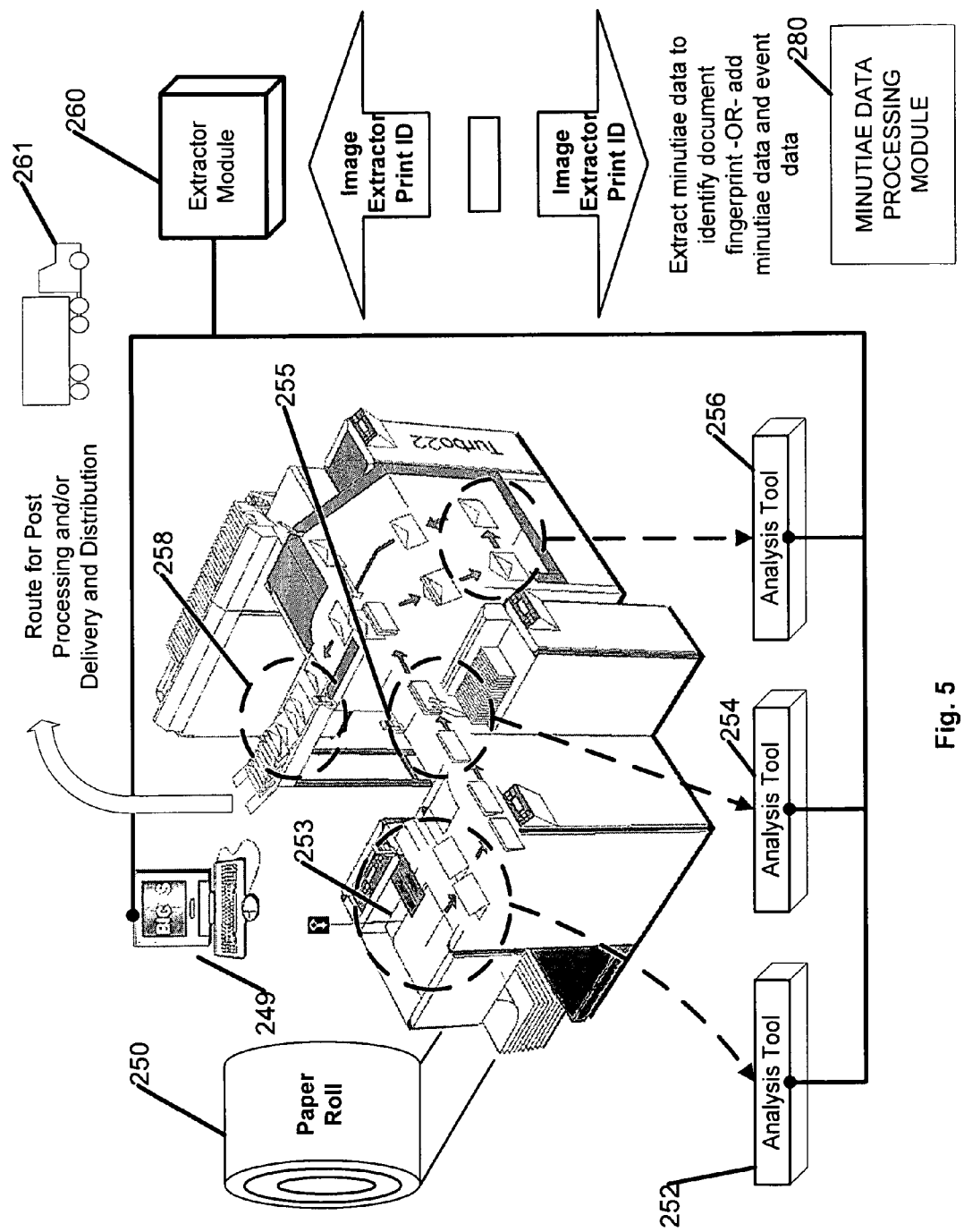
FIG. 5 is an exemplary depiction of minutiae gathering during the hardcopy phase of data extraction of a document.
Figure 6:
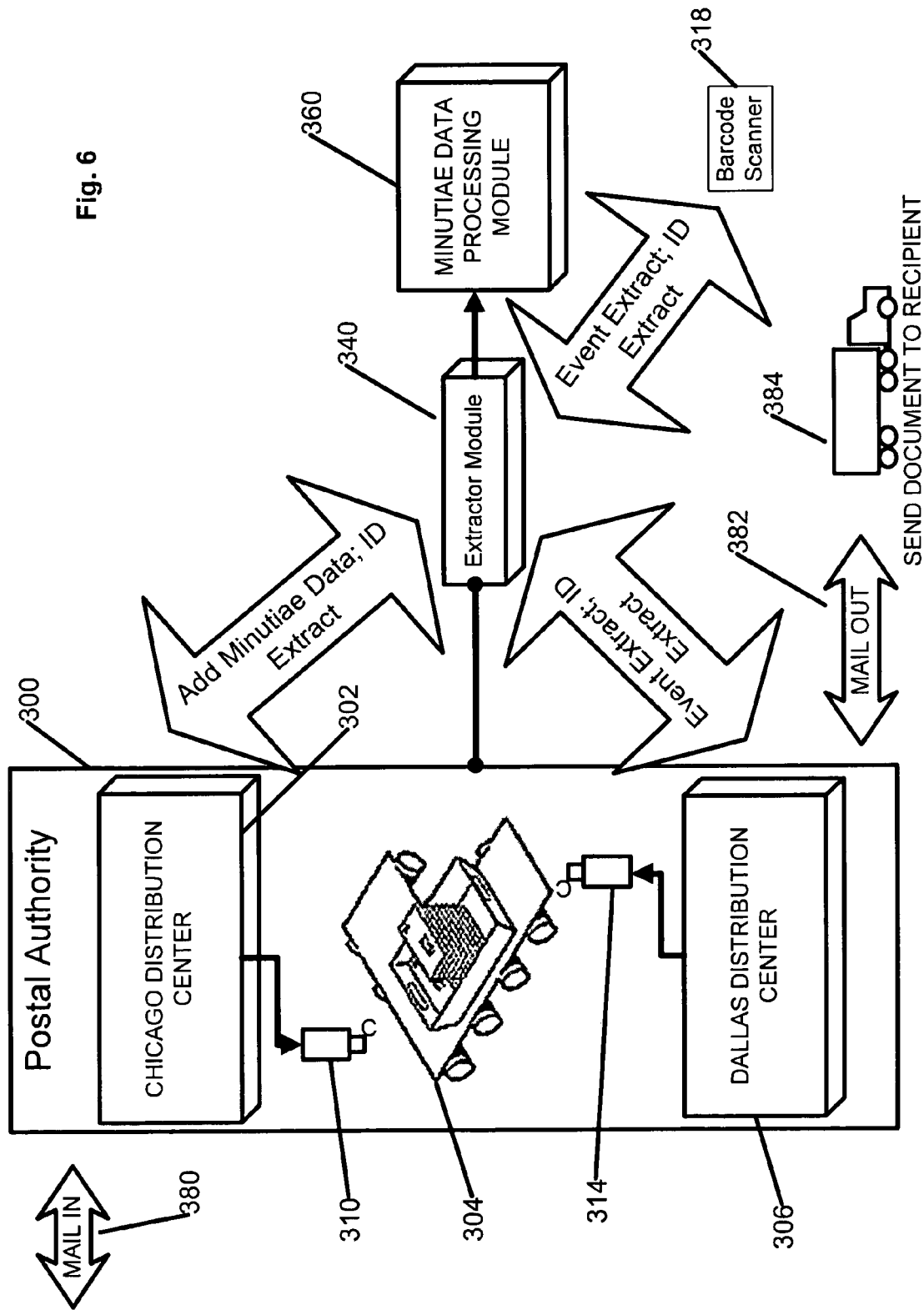
FIGS. 6-7 are exemplary depictions of minutiae gathering during the subsequent observation phase of data extraction for a document.
Figure 7:
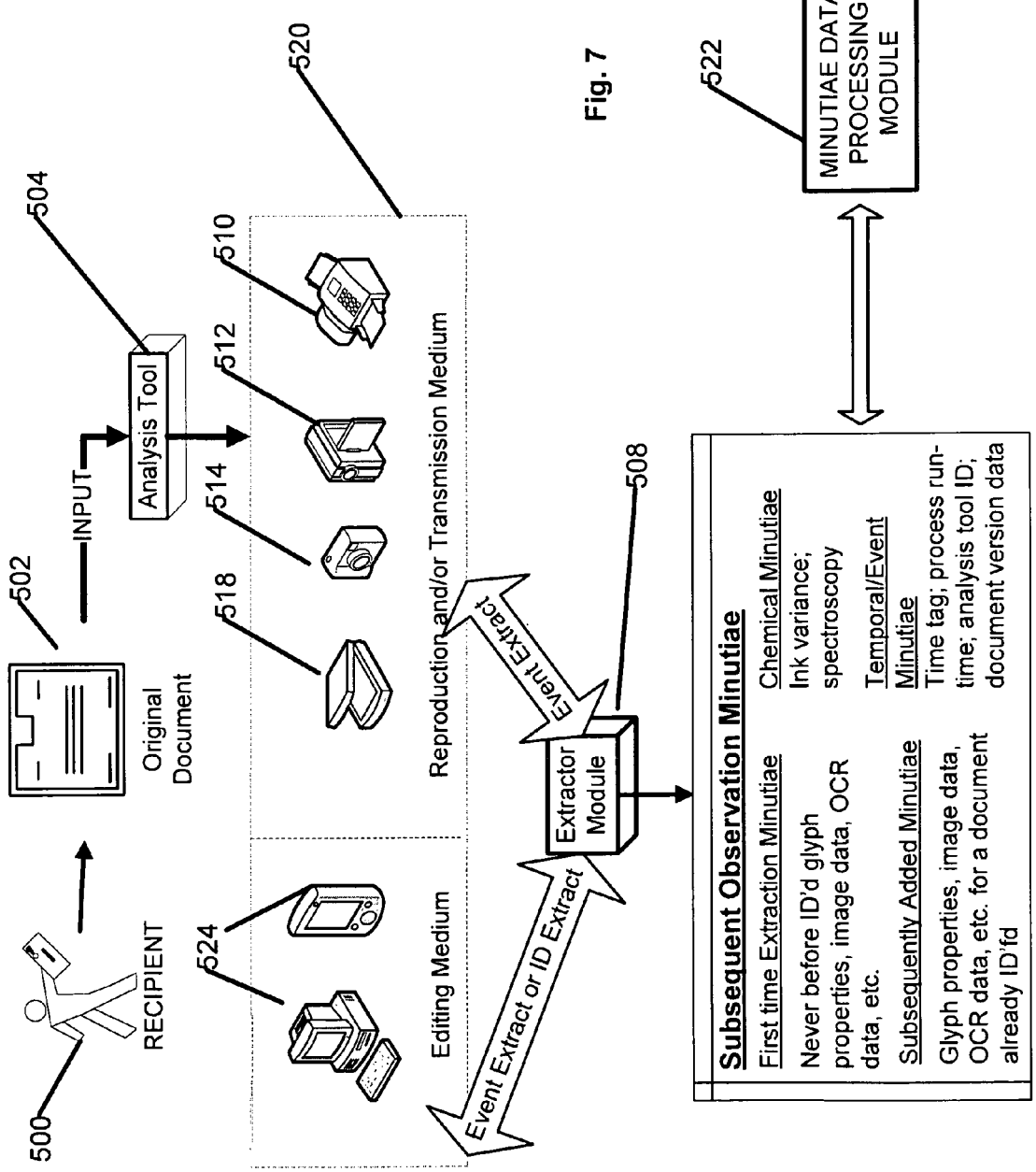

FIGS. 5-7 are exemplary depictions of the minutiae gathering process that may occur during the subsequent observation phase of data extraction of a document. The subsequent observation/collection phase 54 corresponds to moments of subsequent analysis and data collection/extraction beyond any first instance of analysis being performed upon the document, such as in the first observation collection phase 52. Hence, this phase 54 may correspond to the first time of printing of a document or future instances thereafter. Generally, the subsequent observation/collection phase may occur as the document is distributed throughout a mail processing facility 53 or postal network 55, or as the document is processed by a recipient 57 to whom the document was mailed. In some instances, the subsequent collection phase 54 may overlap with the first observation collection phase 52, given that a first instance of print and analysis of a document may occur in the mail factory or elsewhere. This too is true of the document representation phase 59. Consequently, many of the same sensors and analysis tools described with respect to FIG. 5 may be employed for analysis of the document during the subsequent observation collection phase. Indeed, an extractor module may be employed for extracting relevant data for usage as document minutiae data.

In an inserter environment 250, one or more analysis tools, sensors, or a suite of various sensors/tools, depicted as 252, 254, and 256, may operate upon a document being processed by the inserter 250. The analysis tools may be positioned inline at various points along the inserter 250 for analyzing the documents in real-time, or alternatively offline for post-inserter processing analysis. For example, the analysis tools 252, 254, and 256 could be high speed imaging devices (e.g., readers, cameras) for acquiring—but not necessarily interpreting—the various markings that may appear on a scanned document. Coupled to the inserter 250 is a control computer 249, which may provide a user interface that enables an operator of the inserter 250 to interact with inserter control software that runs the inserter 250. Alternatively, the inserter control computer 249 may also be coupled to the various analysis tools—i.e., high speed cameras—for providing a user interface that allows an operator to observe the various images acquired during processing, or control the settings of the analysis tools. Also, the inserter control computer may execute a machine or document control file, which includes various instructions for cutting, folding and manipulating the document as required to meet document preparation needs. Those skilled in the art will recognize of course, that various implementations may be employed other than that depicted herein.

As a first exemplary point of observation, the analysis tool/sensing device 252 may observe a document as it is engaged in front-end inserter processing activities. Such activities may include loading the paper 240 into the feeder module of the inserter 250, and cutting and folding the paper to construct a document of desired size. Generally, the roll of paper is printed in advance by one or more printer modules (not shown) to display the various objects and/or characters that comprise the human or machine readable content of the document. It is fed into the inserter as a continuous roll 240. In the case of a camera being employed as the analysis tool 252, image data pertaining to the document at may be compiled, and translated into minutiae data by the extractor module 260. An extractor module 260 may be integrated with and/or communicable with the suite of analysis tools/sensors 252, 254, 256 (e.g., one extractor module per analysis tool). As before, minutiae data may be persistently stored by the extractor module 260 during the time of document analysis. This data is then aggregated and packaged into a data structure 224.

Also, as indicated before, various minutiae data elements of interest may include word count per page, tab spacing and indentation lengths, margin lengths, number of paragraphs, number of lines, character and/or object coordinate information, and any other data descriptive of the physical appearance of the hardcopy document. Fold and/or cut line location data may also be stored, such as by determining the distance from an edge of the paper to a point of contact with a cutter as measured from an image depicting this point of contact. Minutiae data associated with the structural composition of the document may include reflectance and contrast data, paper density, or paper texture information. Also, in association with the document minutiae data, the extractor module 124 may compile metadata information created by the imaging device 252 as it processes the document 218. In particular, the metadata may include timestamp information, machine ID, machine location, etc. By associating the metadata with the minutiae data collected during inserter processing, a historical account of the activities involving document is maintained. Ultimately, this information is retrieved via its assignment to a unique document identification value.

The data collection process continues at the other points of analysis along the inserter, including during accumulation and merging 255 of the various inserts with a document, envelope insertion 257, and finished document output 258 wherein trays are readied for postal processing and/or distribution 261. In the case of accumulation and document merging 255 and envelope insertion 257, this involves the association of different documents with one another in order to compile a distinct mail article. Keeping in line with the teachings herein, each of these documents (e.g., inserts, document obtained from the print roll 240, the envelope) may themselves be associated with their own unique document identification value (assuming some form of value was initiated at a phase of that document's lifecycle). As minutiae data pertaining to the document is collected at the accumulation phase 255, minutiae data may also be collected for the associated insert(s). In this way, all respective documents may be associated with its own unique document identification value— which as we will see is either created or recalled. As the document plus the one or more inserts have a relationship, their respective minutiae data may also include reference data indicative of the document identification value of its associates. Alternatively, where the document identification value of the inserts are known in advance, the document itself may simply be assigned the known reference values of the inserts without the performance of minutiae data collection for the inserts. Regardless of how this is done, those skilled in the art will appreciate that multiple document identification values having a common association may be referenced to one another. This significantly increases the ability to track a document, and its associates, throughout the document lifecycle, by referencing a particular document identification value as stored to a minutiae database.

Further minutiae data may be accumulated at the finished document output 258 processing phase, including the recording of any postage marks, printer marks, labels or other physical manipulations that may occur from the inclusion of other inline devices. Inline devices may include, but are not limited to, postage meter systems, postage application devices, printers, or labelers. In some instances, these other inline devices may be designated as an analysis tool, and thus may be integrated with an extractor module 260 for enabling the generation of minutiae data. For example, a postage meter enabled with an extractor module 260 could record postage affixed data as applied to a document as minutiae data. Doing so creates an additional audit trail that could be useful for the operator or postal authority 261 in reconciling postage payment discrepancies.

Attention is now directed towards the minutiae data processing module 280. Once minutiae data is stored as a data structure by the extractor module, it is transmitted via a communication channel (e.g., serial connection, LAN connection, wireless connection) to the minutiae data processing module 280. The minutiae data processing module 280 extracts the data populating each field of the data structure, performs any decomposition/formatting of the data if required, then checks the minutiae database (as shown in FIG. 1) to determine if it matches any existing data. The match determination process, as recognized by those skilled in the art, may be executed using varying types of matching algorithms and/or logical instructions. Furthermore, the match determination process may be performed in accord with match sensitivity settings so as to enable high-confidence or threshold based (e.g., specified percentage match) evaluation of the minutiae data against data within the minutiae database. For example, if the match threshold/sensitivity is set to 75%, then a minutiae data set matching less than 75% of any other data sets within the database would be considered a non-match. Suffice to say, any effective or known means of match determination processing is within the scope of the teachings herein.

In instances where no match is found of any of the document minutiae data against the database, the minutiae data processing module 280 associates a unique document identification value with the transmitted data/data structure. This unique identification number may be assigned in various ways, including but not limited to, as a function of the document minutiae data obtained, as a Universal Unique Identifiers (UUIDs), via the application of a hash generation algorithm or other encryption data generation algorithm, as a numeric value of various bits (e.g., 48 bit, 128 bit, 246 bit), or a combination thereof. In this scenario of no match, no minutiae data from the electronic (softcopy) collection phase exists, corresponding to an instance of the hardcopy document being "fingerprinted" (i.e., associated with an identification value on the basis of its unique characteristics) for the first time. On the other hand, when a match is found of any of the minutiae data transmitted by the extractor module 260, such as to within the given threshold, the minutiae data processing module 280 identifies the corresponding document identification value. It may then append any new minutiae data—data not previously associated with the identification value—to the existing data structure.

As a practical example, consider a document for which a document identification value is created during the electronic collection phase of the document's lifecycle. Recall that the minutiae data collected during the electronic collection phase is data useful for defining and influencing the physical appearance of the document when rendered to its hardcopy/printed form (e.g., word count, number of lines, coordinate locations of text and/or images). When the same document is physically rendered and analyzed during the first observation collection phase 52 or subsequent observation phase 54, the same (matching) minutiae data points are identified on the physical representation of the document (e.g., word count, coordinate locations of text and/or images). Additional minutiae data pertaining to this document—i.e., chemical, paper composition—may also be acquired during this phase due to the application of additional analysis tools/sensors. Hence, the minutiae points identified in the physical that match those identified in the electronic, triggers the recollection (identification, fingerprint match) of the correct document identification value by the minutiae data processing module. Resultantly, the additional minutiae data (e.g., chemical composition minutiae data) is simply appended to the existing data structure for the document, such that this information is now too associated with the originally assigned identification value.

As an additional capability, the minutiae data processing module 280 may also communicate with the extractor module 260 in cases where a match is identified. By doing so, the extractor module 280 may further communicate relevant information to the device, process or utility in which it is integrated or communicable with. Those skilled in the art will recognize the various implications of this capability as it pertains to document processing and control. For example, in an inserter environment, a physical document may be identified/fingerprinted in order to access machine or document control instruction files relevant to that document. In this way, an operator who previously had no access to the machine or document control files required to construct a document via the inserter may acquire such information by fingerprinting the document, and then subsequently accessing the reference data that indicates the source, location, author, resource link, etc. of the machine and document control files. As another example, consider a sorting environment, wherein a physical representation of a document may be fingerprinted in order to access reference data indicative of the source, location, author, etc. of an inbound sort scheme relevant to a particular mail article. In this scenario, the physical characteristics of a single mail article (e.g., an inbound mail article), upon being associated with its document identification value, could enable access to the appropriate inbound sort scheme relevant to the receiving organization. This would significantly reduce the amount of scheme customization required by a sorting manufacturer in adapting a newly installed sorter to an organization.

Another benefit derived from the minutiae data processing module 280 being able to communicate back to the extractor module 260 is in providing alerts of instances of document matches. For example, when a user of a document composition tool having integrated extractor module functionality (e.g., extractor enabled or fingerprint enabled) wants to gain access to information regarding an original instance of a document they are currently viewing, this information could be communicated to the user. Communication of the information could be in various forms, such as via a pop-up window being rendered to the user interface, or an e-mail communication. The minutiae data processing module 280 may return the document identification value associated with the instance of document being viewed—if a match between the current instance of the document and an original instance is determined—along with any metadata (e.g., history data, event data, resource data) pertaining to the original. Based on this awareness, the user may then be presented with one or more options that impact the instance of the document being viewed, including but not limited to: enabling the determined document identification value of the document being viewed to be associated with or referenced to a document identification value assigned to an edited instance of said document, or enabling the application of special instructions that were used to compose the initial instance of the document for application by the current document composition tool upon which a current instance of the document is being viewed (e.g., enable the Macro "My_Thesis_Objective" as used by the original document composition tool to be utilized by the current composition tool; modify the user interface settings of the current document composition tool to match that of the originally used composition tool). Alternatively, the extractor module may perform one or more of the above described options automatically.

Overall, the document identification/minutiae data matching confirmation process may be configured to be performed automatically by the minutiae data processing module 280 upon identification of a match, or invoked by the user via the user interface. In the case of invocation by the user, this process may be accomplished by means of a command line interface, or from the clicking of a button from the graphical user interface of the current document or printstream composition tool (e.g., button on a toolbar reading "GET FINGERPRINT"). Those skilled in the art will recognize that various techniques for integrating or embedding additional functionality into software applications are well known (e.g., Google™ toolbar for integration within a web browser), and that any means for doing so is within the scope of the teachings herein.

Reference is now made to FIG. 6, which depicts an exemplary high-level postal network 300 wherein a document may be processed. The postal network may include a plurality of mail distribution and processing facilities, including sectional center facilities (SCFs), bulk mail centers (BMCs) and automated area distribution centers (AADCs). Various rules apply for directing mail between these facilities based upon various factors such as the type of information placed onto a mail item (e.g., 3-digit vs. 5-digit ZIP Code), the rate category for which the mail qualifies, etc. In the exemplary depiction, a document destined for Dallas is first received and processed by a postal facility 302 from which the document originated located in Chicago. Various types of processing may be performed upon the mail piece by the Chicago postal facility 302, such as stamping of special instructions, labeling of the document, the addition or correction of address information for forwarding purposes, the addition of written marks, sorting by a mail processing and/or transport device 304, etc. Similar processing may also be performed once the document is received by the Dallas postal facility 306. Both facilities may also employ one or more analysis tools/sensor suites, such as cameras 310 and 314 or barcode scanners 318 for processing a document. The occurrence of the above described processing events represent instances wherein minutiae data pertaining to the document may be perceived, subsequently extracted, then logged (associated with a document identification value) and/or matched for document identification purposes. Hence, an extractor module 340 and minutiae data processing module may be employed in a manner as described previously to acquire and/or interpret minutiae data pertaining to a document.

As such, minutiae data pertaining to a document, such as an envelope containing various inserts and/or documents, may be maintained from the moment of arrival 380 to an initial postal processing facility 302, through the postal network 382, to the time the delivery is to be directed to the intended recipient 384. To enable data extraction, an extractor module 340 may be execute upon the various sorters, transport devices, barcode scanners, cameras, or other analysis tools utilized within the facility. Likewise, the minutiae data processing module 260 may reside locally (e.g., upon a server operable within each postal facility), or remotely such as by a third party provider. When the document is identified as being associated with an existing document identification value, any new minutiae data may be appended to the existing minutiae data accordingly. Of interest to those skilled in the art is the capability of accessing various event data such as postal sorting machine ID or timestamp data by referencing the document identification value, for enabling persistent tracking of the document as it continues further throughout the subsequent observation/collection phase 54 of its lifecycle, and further into the document representation phase 59.

Additional processing that may occur during the document representation phase 59—beyond postal network processing 300—is depicted in FIG. 7. When a document (e.g., stock certificate 502) is received by a recipient 500, this document may be further processed by one or more extractor enabled 508 analysis tools/sensors 504 for gaining more information regarding the document (e.g., it's history, source of origination, authenticity). For example, a micro/macroscopic analysis tool (e.g., SEM machine) may be employed in order to generate internal structure based minutiae data pertaining to the document 502. In transmitting the minutiae data to the minutiae data processing module 522, it may be compared to determine if it matches any existing minutiae data previously associated with the document via a document identification value. If a match is determined, an identification alert may be transmitted to the recipient 500 or the analysis tool 504, wherein the alert is displayed to an LCD display resident upon the device 504. Additionally, the data on record may be updated to include additional minutiae data not previously identified (e.g., a pen mark applied by the recipient to the physical document 502), as well as the updating of any metadata (e.g., time stamp data, analysis tool ID data, recipient ID data).

In addition, or alternatively, the document 502 may also be processed by one or more extractor enabled 508 electronic representation mediums 520, corresponding to the document representation phase 59. Devices of this nature include, but are not limited to fax machines 510, scanners 518, image capturing devices 512, digital cameras 514 and any other devices for generating an electronic representation of the physical document 502. Minutiae data as acquired from the processing of the physical document 502 by these devices 520 may be passed on to the minutiae data processing module 522 for updating of an existing data structure pertaining to the document (in instances where the document's unique identification value was determined).

The document when processed by one or more of the electronic representation devices 520 may also be rendered for display via one or more computing devices 524. For example, when the document 502 is scanned by the scanner device 518, the image representative of the scanned document 502 may be rendered to the user interface for observation. When the computing device 524 is extractor enabled 508, a determination as to whether or not the document being viewed matches any existing document identification value may be performed in accordance with the process described earlier. In instances where no identification value is identified for the rendered document, this indicates the observance of a previously unidentified document. In such a case, a document identification value may be assigned accordingly. Essentially, where the document is scanned, imaged, or in any way rendered for display electronically, this represents an occasion for the collection of minutiae data pertaining to the formatting, display instructions, and any other data descriptive of the physical characteristics or content of the document. Hence, practitioners of the art will recognize that the ability to initially assign a document 502 with a unique identification value need not be limited to the electronic collection phase 52. Furthermore, it will be recognized that the document lifecycle and/or processing phases 50, 52, 54 and 59 as presented herein need not occur in a sequential order. Indeed, any instance wherein an extractor module is resident or communicable with a device capable of processing a document 502 provides a means for data extraction and/or document identification.

Figure 8:
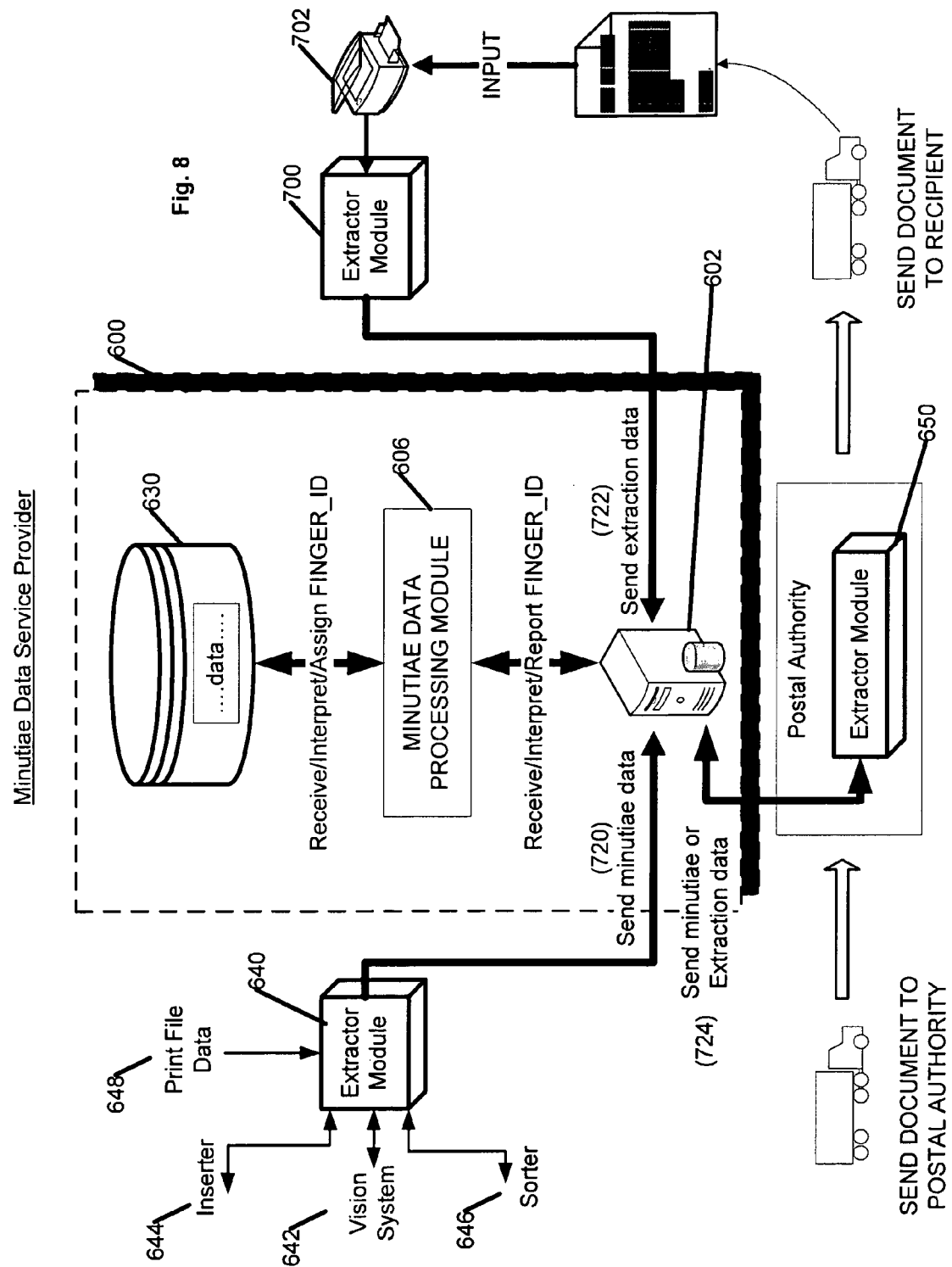
FIG. 8 is an exemplary depiction of a system and scheme for maintaining and enabling document identification throughout all phases of the data extraction process.

Reference is now made to FIG. 8, which depicts a high-level distributed extractor module environment for enabling document identification. A centralized document identification value management provider 600 may maintain a secure server for regulating access to a minutiae data processing module 606. The server may also maintain a central document minutiae database, wherein all document identification values and their associated minutiae data and/or metadata information is stored. In accordance with the teachings, extractor modules 640, 650 and 700 may be executable in connection with one or more analysis tools/sensors (vision system 642, scanner device 702, inserter or sorter control computers 644/646, barcode scanners). In addition, the extractor module may be executable in connection with various document composition tools and/or printstream composition tools for composing documents and/or printstream manipulating print file data 648. As documents are operated upon at various phases of processing, extracted minutiae data is sent to the server 602 for processing by the minutiae data processing module 606, represented by the solid arrows 720, 722 and 724. As stated previously, the minutiae data processing module 606 may itself be distributed, such that it may operate or reside locally, or in proximity to, the various extractor modules for which it communicates. However, as a centralized device, module or process maintained by a minutiae data service provider 600, increased integrity of the minutiae data compiled to the document minutiae database 630 may be maintained, as only limited access to such data could be granted. In addition, greater management of the myriad of extractor enabled devices may be maintained, such as by requiring the registration of an extractor enabled device with the minutiae data service provider before enabling minutiae data collection or document identification value requests to be granted.

Figure 9:
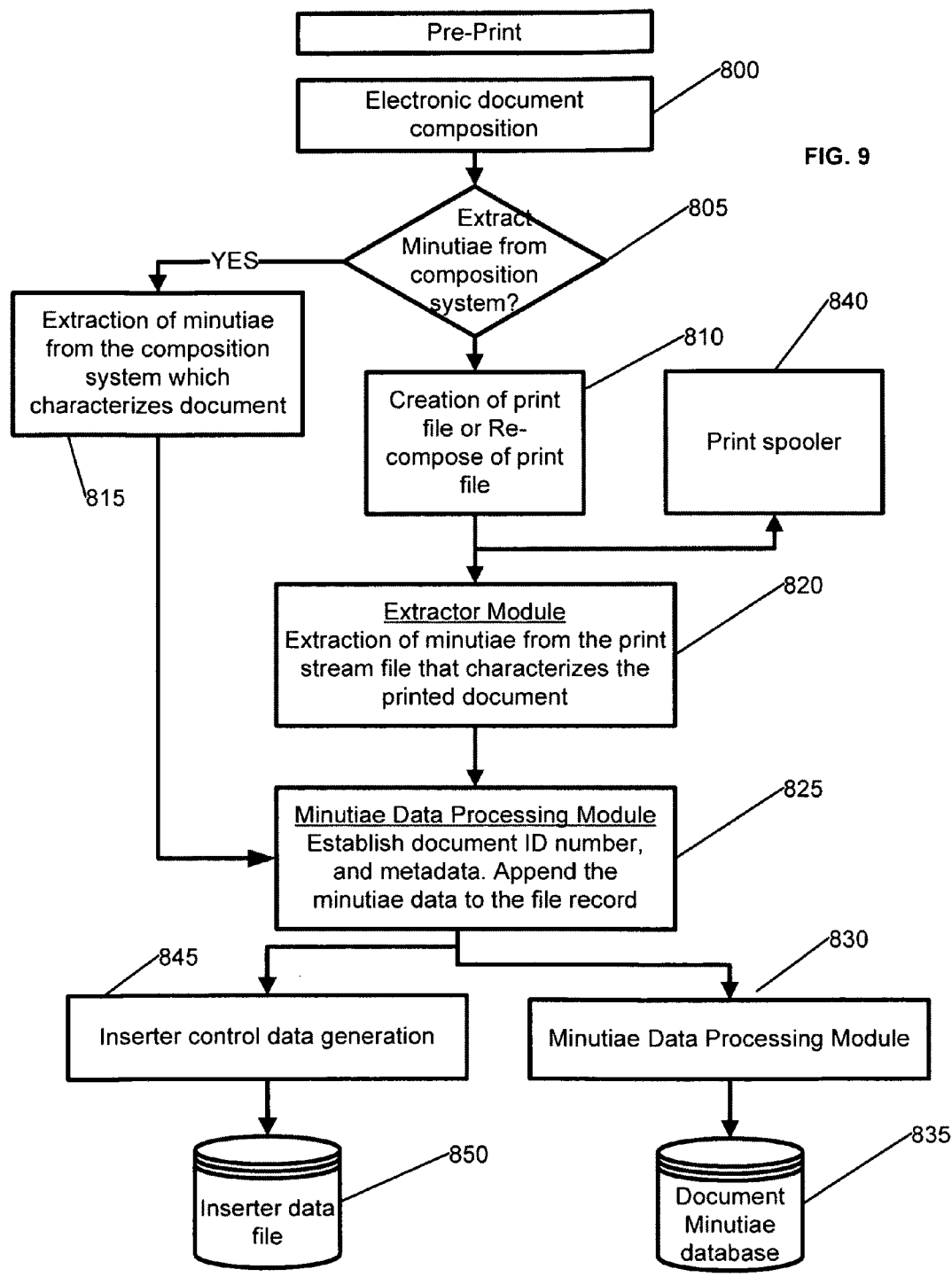
FIG. 9 is an exemplary flowchart depicting the document fingerprinting process starting with the document in electronic format.

Additional clarification of the document fingerprinting processes, beyond the functional operation of the system as defined in the preceding figures, is obtained by explaining the processes in a flow diagram format (FIGS. 9 through 14). FIG. 9 defines the document fingerprinting process starting with the document in electronic format, referred to as the pre-print phase. Even though the document fingerprinting process will be explained in terms of the identification and tracking of documents that will be inserted into an envelope for eventual mailing to the recipient, the document fingerprinting processes not limited to this example. Any document that is created from an electronic media can be fingerprinted and tracked using the techniques described. Electronic document composition 800 is a suite of tools or an integrated product that collects data from numerous sources, such as accounting, graphics and marketing departments, to build a document to be delivered to a customer or mail recipient. The structure and content of the document is defined in this step 800, therefore all the information is present that is required to eventually create the physical document.

Document fingerprinting requires that minutiae regarding the document be collected at multiple stages during the documents creation and utilization. Extraction may be performed at the time of composition and/or after a print file has been created. If extraction has been enabled 805 at the composition point, then minutiae features that can be used to identify the document after print are collected 815. Minutiae is used in a very general sense throughout the document fingerprinting process to mean any features of a document that can be used to recognize the document each time it is observed during the life cycle of the document. At the composition step 800, text, graphics, and numeric information is defined as well as the location (coordinates if the item on the page) for each composition item. This data is collected 815 from the composition tool and catenated with document identification (ID) and metadata 825.

The document ID may be assigned by the system or created using the stored minutiae data. Since the minutiae data is not identical for any two documents, if examined in sufficient detail, an algorithm can be used to generate a unique document ID using the stored minutiae data. One example could be a cyclic redundancy check (CRC) which is a type of hash function used to produce a checksum—a small, fixed number of bits generated from a block of a computer file which contains the document minutiae. Those skilled in the art may select other algorithms that are more efficient at creating a unique ID from data stored in a computer file. Metadata is used in a general context which refers to any data that is stored about the document that has been fingerprinted. This data may include the name of the addressee, the date created, the operator using the composition tool and numerous other data points. Many additional data fields will be added each time action is taken on the document or each time the document is observed. The metadata defines all information relevant about the document throughout its life cycle.

Even if extraction of minutiae is performed at the composition point 815, a print file, in one of the standard formats (Advanced Function Presentation (AFP), Printer Control Language (PCL), or Hewlett Packard Graphics Language (HPGL) is created 810 so that the document may be printed 840. This provides an opportunity to extract minutiae from the print file 820 that will be used to recognize the printed document. Since the print file contains all of the data or atoms of information plus the printer control data, very detailed minutiae can be extracted. These minutiae will be different and more detailed than the minutiae that are extracted from the composition step 815. In some instances, the print file will go through a re-compose step 810 where additional information is added to the print file plus format changes are incorporated. In this case step 820 would be repeated since the minutiae data would change to represent the document that is going to be printed. Depending on the document identification requirements, the document fingerprinting system can be setup to fingerprint all pages in a document or just the first page. Fingerprinting all pages gives more flexibility in recognition of the document but adds considerably to the processing and data storage requirements.

If both composition and print file minutiae and metadata exist, then the data must be merged by appending new information, excluding redundant data and generating a new document ID 825. The ID, minutiae and metadata are passed to the minutiae data processing module 830, which controls any updates or additions to the document minutiae database 835. The document minutiae database and minutiae data processing module may be hosted locally within an Automated Document Factory (ADF) or hosted remotely using a wide are network (WAN). The WAN network maybe the World Wide Web or it maybe a dedicated network using T1 lines or their equivalent. In either case, security protocol such as encryption may be used depending on the user's requirements. The document minutiae database 835 may be divided into multiple databases that are used locally for a specific job runs or the database maybe hosted and is a global database that is accessible to many processing functions and users.

In the mail processing example an additional process 845 is required to create the Inserting Data File (IDF) 850 that is used to control the inserter FIG. 5 for document assembly 253, insert feeder control 255, insertion into an envelope 257 and application of postage in the output section 258 based on projected weight of the finished mail piece. All of this IDF data will be used to control the inserter after the document is recognized based on its fingerprint during the initial infeed 253 of the document into the inserter. The inserter control data generation can be accomplished by associating the fingerprint document ID with control information created during document composition or by analysis of the print file. The ability to extract IDF data is well understood by those skilled in the art. An alternate approach is to include the IDF data as metadata that is stored in the document minutiae database 835. When the document is identified upon entry into the inserter the IDF data would be extracted from the metadata and provided to the inserter control system.

Figure 10:
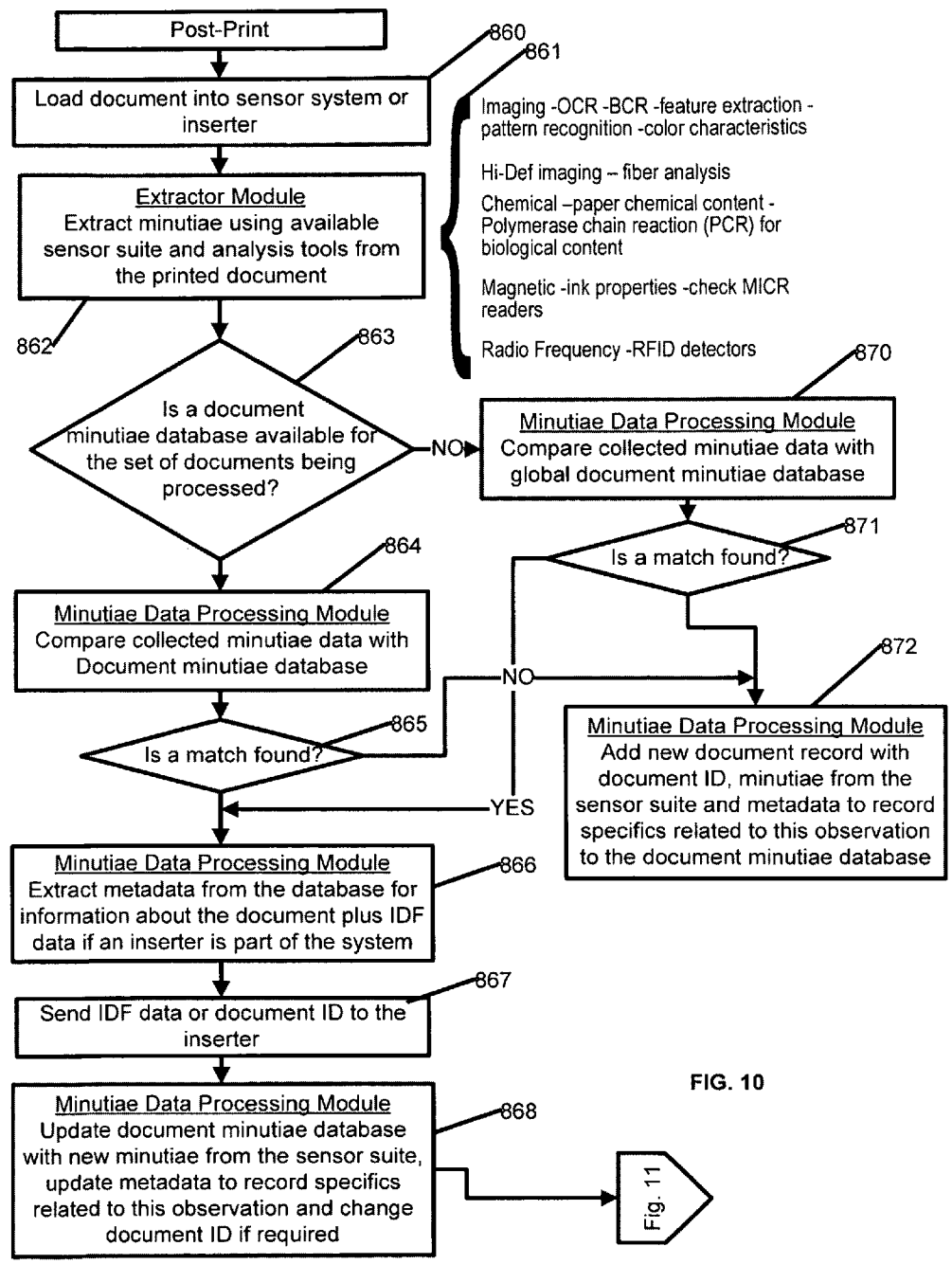
FIG. 10 is an exemplary flowchart depicting the first observation of the document post-print.

The next process to be described occurs at the first observation of the printed copy of the document, referred to as the post-print phase. The post-print phase involves document recognition, if a document minutiae database entry was created pre-print, and creation of new or additional minutiae data using the sensor suit available at the observation location. FIG. 10 depicts the first observation of the document post-print. The printed document is loaded into the sensor suite 860, which maybe stand alone and used to identify and track high value documents such as stock certificates. Numerous other document types maybe fingerprinted, identified and tracked. For the mail example, the sensor suite will be located at the input to the inserter FIG. 5 253 where the paper document is first presented. A variety of sensors maybe used in the sensor suite depending on the amount of minutiae that is needed to uniquely identify the document. A list of possible sensors is shown in 861. An imaging sensor such as a camera or linear array image capture device will be used in nearly all cases on an inserter.

Minutiae extraction is performed using the sensor data and accompany analysis tools 862. In addition, the imaging sensor can be used to locate the position of images such as logos and to identify the image using matching algorithms. Measurement of word count, paragraph count, paragraph locations on the document and heading locations are all fingerprint data that can be used for identification. Other sensors are currently available that add extra depth to the identification process by extending the fingerprint beyond what is generally used. For example, high definition imaging can be used to examine the patterns created in a specific area of the document by the paper fibers or via pulp concentration. Chemical properties of the paper can be sensed and any biological content can be sensed with Polymerase Chain Reaction (PCR). The magnetic properties of the ink can be used to identify the difference between water based ink and magnetic ink such MICR used in checks. Toner from laser copiers will also have different magnetic properties. Radio Frequency Identification (RFID) is a sensor that can be used to read encoded tags or to read a serial number off the document page that is generated from imbedded conductive fibers. The serial number may be an actual code or number or another form of recognizable pattern unique to the document page. Those skilled in the art will add additional sensors as required to ensure and unique identification of the document.

Many processing applications that use document fingerprinting will use a limited minutiae database that is applicable to the current operation. The database may be limited to those documents that were printed just before manufacturing of the mail pieces. If a unique database has been identified 863 then the fingerprint search can be limited to that database which will contain fingerprint data collected pre-print 864 as previously described. If a fingerprint match is found 685, then pertinent metadata can be extracted 866 and if the fingerprint matching is for an inserter operation, the IDF will be extracted and sent to the inserter control system 867 to control the different stages in assembly of the document. Alternately, the document ID is identified from the document minutiae matching process and this ID is sent to the inserter control system. For this alternative, the IDF data is sent directly to the inserter control system from the composition or re-composition tool. Such items as the cutters are controlled using page count data and insert feeders 255 maybe selectively used based on the document metadata such as name of the recipient. The parameters needed for inserter control are well known by those skilled in the art. If no match is found, the inserting operation will halt for corrective action by the operator. If this is not an inserting operation, a new document entry will be added to the minutiae database 872. The minutiae data processing module 868 is used to update the document minutiae data with the new information collected by the sensor suite 861. The metadata is updated with information about the document such as machine operator, processing time, inserter ID or other parameters that relate to the first observation of the printed document. For observation of other types of documents beyond those that are being processed on an inserter, numerous other parameters maybe added to the metadata as required by the application.

If a limited minutiae database is not available 863, then the global database will be searched 870 to find a fingerprint match. This global database maybe hosted in the local facility or could be part of the networked database. If a match is found in the global database, then the document if is passed to the minutiae data processing module 866 for extraction of metadata. The process then continues as described above. If no match is found, the inserting operation will halt for corrective action by the operator. If this is not an inserting operation, a new document entry will be added to the minutiae database 872. The data added to the minutiae database will include the minutiae data, metadata and document ID.

Figure 11:
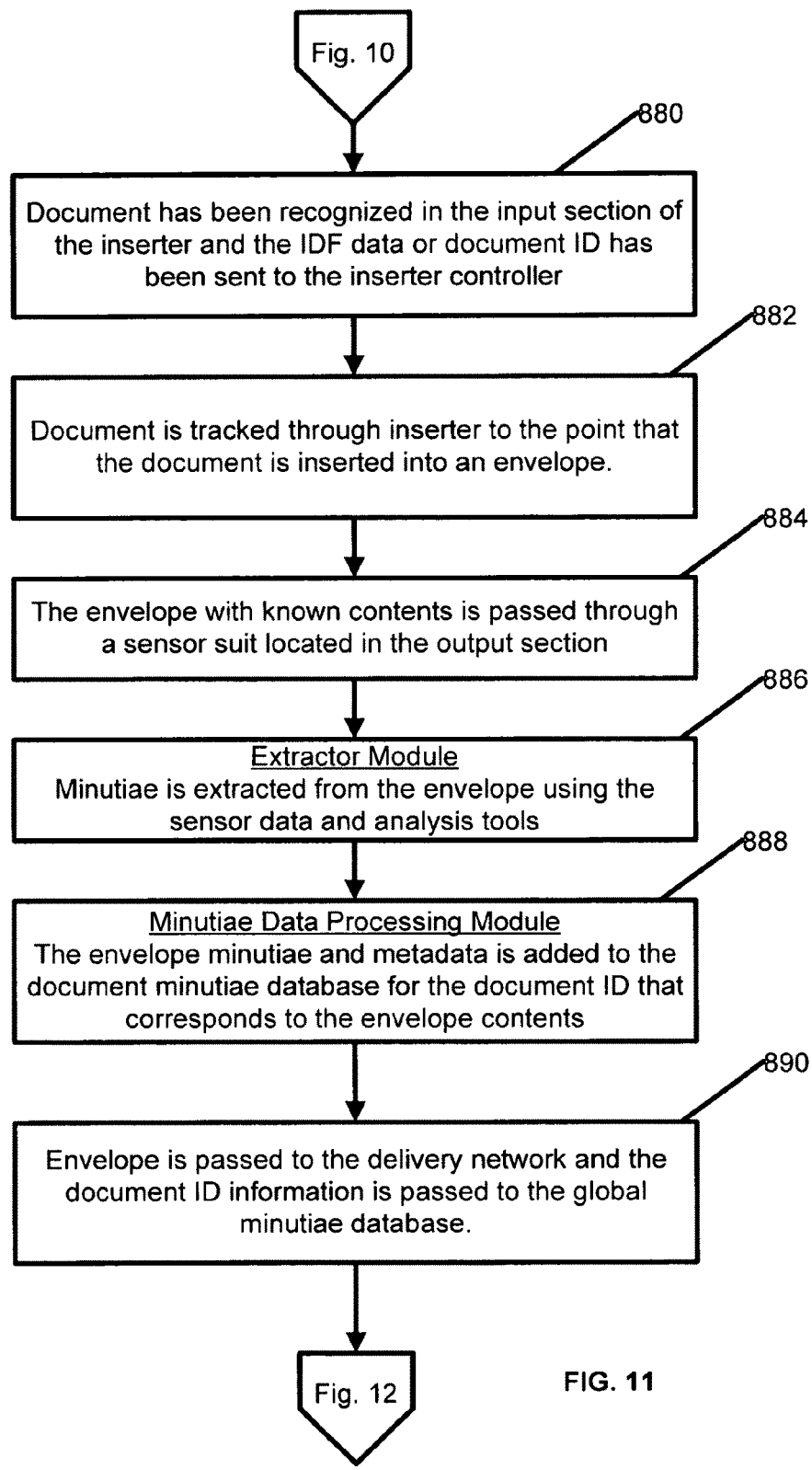
FIG. 11 is an exemplary flowchart depicting the document tracking process within an inserter system.

FIG. 11 depicts the process within an inserter system. Once the document has been recognized in the input section 880 of the inserter, it must be tracked during each step of the insertion process. Document tracking in an inserter is commonly done with currently available inserters. The inserter operation is controlled by the inserter control system using control data from the IDF file 850 which is referenced with the document ID or the control data is extracted from the metadata in the document minutiae file 835. The document with inserts added by the insert feeders FIG. 5 255 passes to the envelope insertion station 255 where the document plus inserts is inserted into an envelope. The envelope tracking continues until the envelope reaches the sensor suite located at the output module 258. At this point the fingerprint characteristics of the envelope are evaluated using the sensor suite 884. As previously described, the extractor module will extract minutiae data associated with the envelope from the sensor suite data 886. These minutiae may include but are not limited to, number of works in the address, location of the address block on the envelope, number of lines in the address block, location and characteristics of the address block, type and location of the indicia, paper fiber structure in a region of interest, etc. The minutiae data processing module appends the minutiae data associated with the envelope to the document ID file for the document contained within the envelope 888. The finished envelope will then be transported to intermediate processing centers for eventual delivery to a customer and the associated minutiae data file will be used to update the global minutiae database 890.

Figure 12:
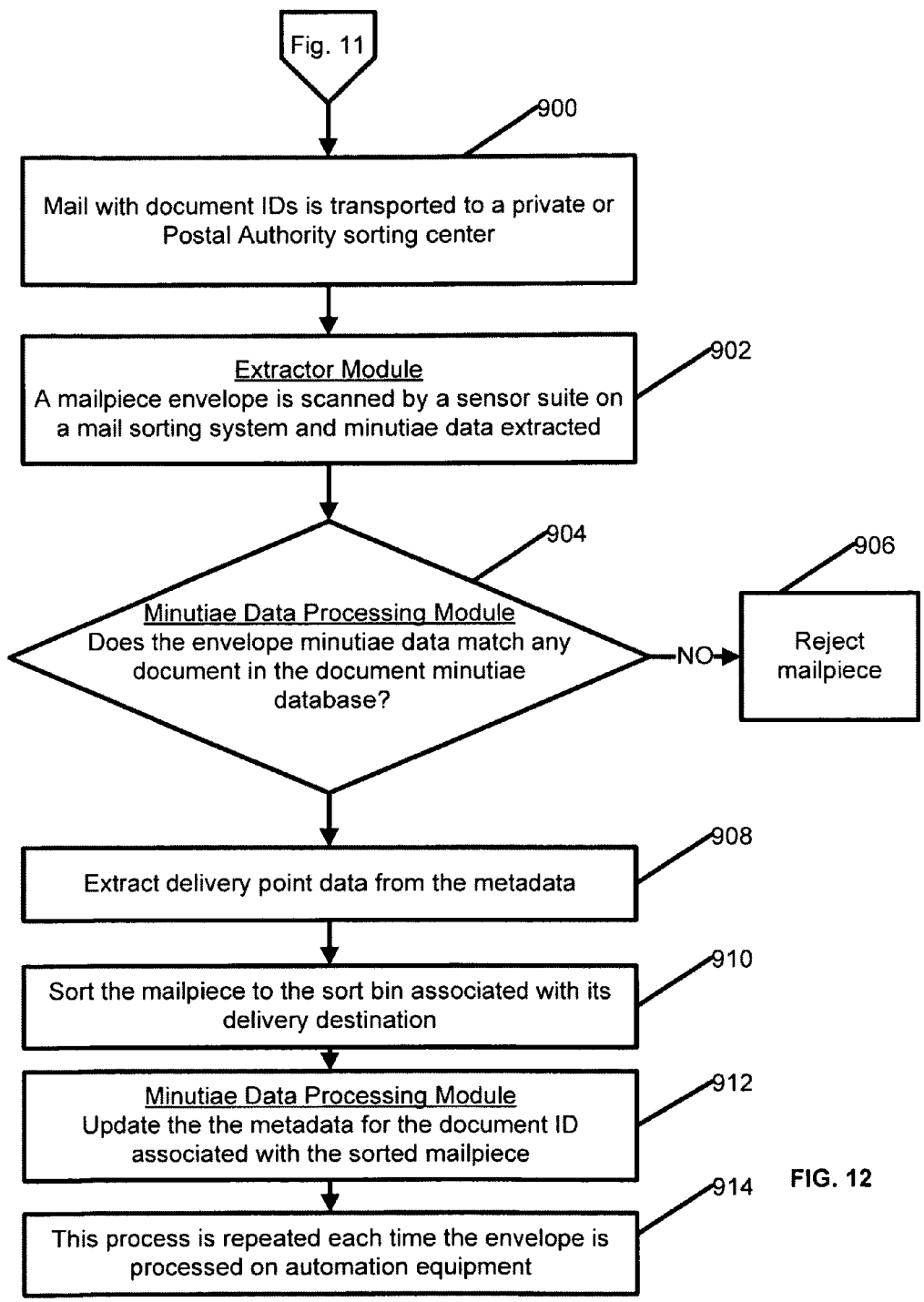
FIG. 12 is an exemplary flowchart depicting the processing steps in a sorting center.

Numerous intermediate processing steps are involved before the envelope is finally delivered. Each of these intermediate steps involves sorting the mailpiece based on its delivery point. FIG. 12 defines the processing steps in a sorting center 900. The mailpiece along with all other mailpieces to be sorted are loaded onto the sorter for processing. The sorter feeder separates each mailpiece so they can be individually processed into the sensor suite on the sorter 902. Minutiae data is extracted from the sensor data as previously described in the extractor module. The extracted minutiae data is compared to data in the global minutiae database to find a match 904. If not match is found, an error has occurred and the mailpiece is rejected and will have to be manually processed. When a match is found, the delivery point data is extracted from the minutiae database metadata 908. The delivery point generally will be a ZIPCODE for USPS applications. The delivery point data is then used to control the sorting of the mailpiece into the correct sort bin that is associated with the delivery point and the sort scheme being used on the sorter 910. Once the sort is complete the minutiae data processing module will update the metadata associated with the document ID just processed 912. The metadata may include but is not limited to processing time, location, operator or other parameters important to tracking the document.

The sorting process is repeated numerous times at different locations during the delivery process 914. The process defined in FIG. 12 will be repeated each time.

Figure 13:
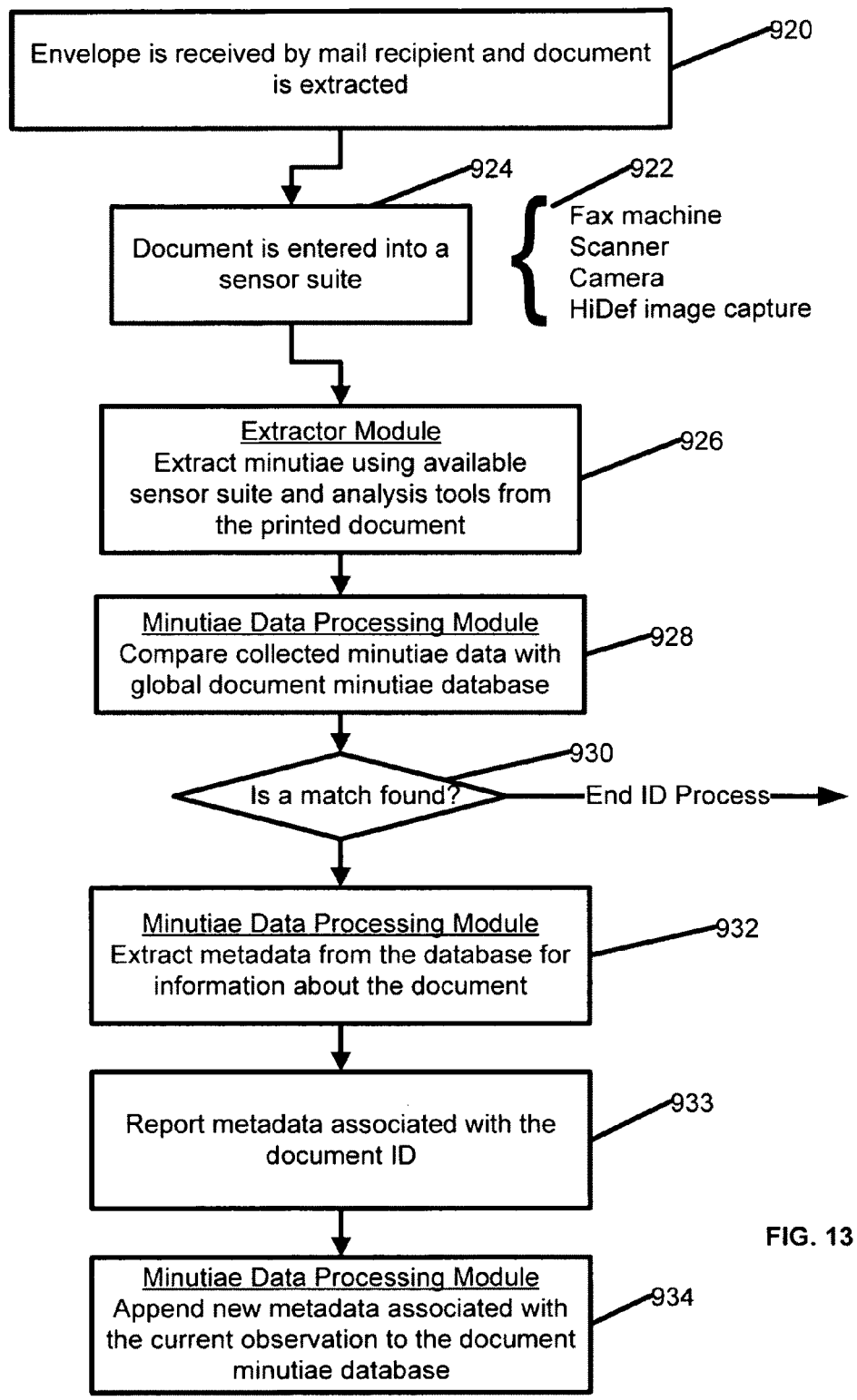
FIG. 13 is an exemplary flowchart depicting the processing steps in the document representation phase, post delivery.

FIG. 13 represents the processing steps in the document representation phase, post delivery. Document tracking and identification does not stop upon delivery to the postal customer. Once the document has been extracted from the envelope 920, a common step in the document representation phase is to make a digital image of the document for storage or transmittal to another recipient. This same process is frequently performed on numerous other document types, such as but not limited to checks, lottery tickets, insurance claim forms and stock certificates. These documents are entered into a sensor suite 924. The sensor suite at this stage is likely to be a FAX machine, scanner, camera (image capture) and optionally a HiDef image system that supports paper fiber analysis 922. Other sensors, that were previously mentioned, may be added as required to insure document identification. The extractor module will extract minutiae from the sensor data using the appropriate analysis tools 926. The minutiae data processing module will compare the extracted minutiae data with the document minutiae database 928 to obtain a document ID match 930. If no match is found the document identification process is stopped. When a match is found, the minutiae data processing module extracts the metadata for this ID 932 and reports the information to the user 933. Since this identification represents a new event in the history of the document, new metadata associated with the current observation will be appended to the document minutiae database 934. This process flow is repeated each time the document or a copy of the document is scanned with a sensor suite and identification is requested. Alternately, document identification is possible each time the document is viewed electronically on a display. The extraction process 926 can be performed against the image of the document that is being displayed and minutiae data extracted. The minutiae data processing module will do the comparison, obtain a match, report metadata and update the metadata as required. Computer image format conversions between the many known standards (JPEG, TIF, PDF, BMP) maybe required to improve the extraction process. These conversions are well understood by those skilled in the art. Document processing devices such as FAX or copier machines can be document fingerprint identification enabled. This means that the device can extract minutiae and use a minutiae data processing module to match a document ID and collect and display or print relevant metadata.

Figure 14:
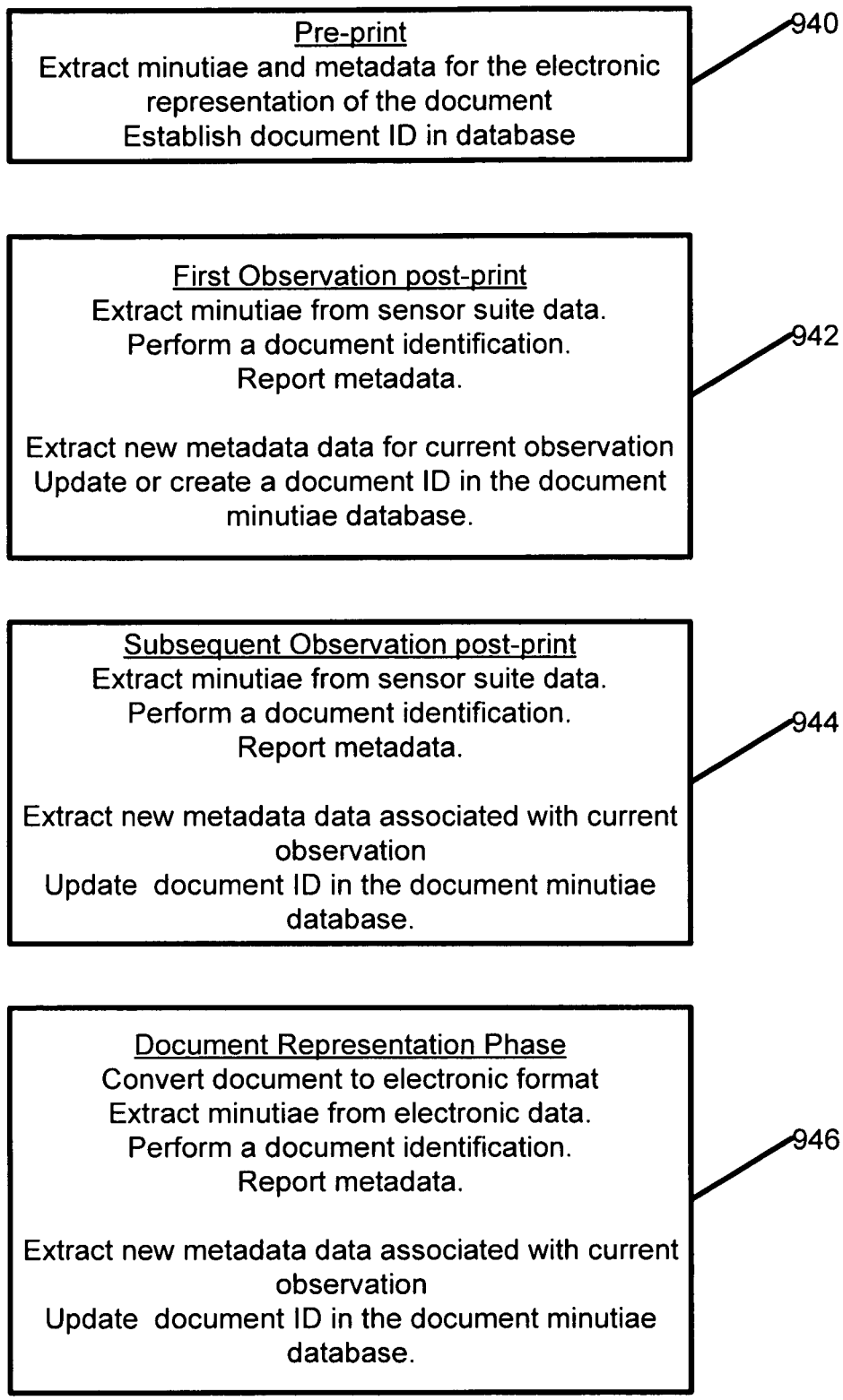
FIG. 14 depicts exemplary steps that may be included in the document identification and tracking process utilizing document fingerprinting techniques.

The process flows provided in FIGS. 9 through 14 provide one representative example of how document identification and tracking would be accomplished using the document fingerprinting concept. The example is focused on the mail processing environment, but this example in no way limits the document fingerprinting approach. Those skilled in the art will adjust the processes for the banking industry that maybe tracking checks, state lottery offices that maybe tracking lottery tickets, security organizations tracking stock and bond certificates or insurance companies tracking claim and accident reports. FIG. 14 summarizes the typical steps that may be included in the document identification and tracking process utilizing document fingerprinting techniques. The Pre-print phase 940 processes minutiae and metadata for the original electronic version of the document and creates a document ID file in the document minutiae database. The first observation post-print phase 942 involves two possible processes.

For process one, the minutiae data needed for identification is extracted from the sensor suite data and a match is made with the document minutiae database if a pre-print entry exists. The document ID in the document minutiae database is updated with new minutiae and metadata from this observation. For process two, there is not pre-print data available so this observation is the initial minutiae extraction event. As a result the new minutiae data and metadata is added to the document minutiae database with a new document ID. Pertinent metadata is provided to a user or subsystem as required. Subsequent observation post-print 944 is generally an observation associated with identifying the document in question and tracking it through a document life cycle of observations. In some cases the document is observed directly and in other case the document is indirectly observed since only the envelope containing it can be observed. New minutiae data is generally not added to the document minutiae database at this time. Exceptions would be if this is the first observation of the document in an envelope or a new sensor was added to the sensor suite. Metadata is added to the document minutiae database to represent this observation. Pertinent metadata is provided to a user or subsystem as required. Document representation phase 946 is where the document is frequently converted into an electronic format for storage or forwarding to another recipient by electronic means. Minutiae can be extracted from the electronic format and used to ID the document and to obtain metadata. In addition, the minutiae data maybe updated for easier future identification of the electronic version. Metadata is added to the document minutiae database to represent this observation. Devices such as but not limited to scanners, FAX machines, copiers and computer terminals can be document ID enabled so that extraction and document identification can be accomplished through access to a minutiae data processing module and the document minutiae database.

Those skilled in the art will recognize and appreciate that all of the above described analysis tools are suitable for extracting pertinent minutiae data associated with a document, and that any other tools of a similar nature could be employed. Indeed, in the case of various tools, such as imaging tools (e.g., camera, readers, etc.), data may be collected without necessitating a decoding or interpretation of such data. For example, while extraction of the various lines, characters, symbols, or objects appearing on a document may commence with an imaging device, the analysis of such information is a separate function generally performed via object character recognition (OCR) technology. OCR, as practitioners of the art will recognize, is not a necessary feature requiring employment within the context of the teachings. However, OCR or barcode reading may be employed if desired, such that the minutiae data may also include content information (e.g., specific text, phrases, numbers, barcode contents or combinations thereof). Again, as no one minutia item is sufficient for unique identification of the document, the collection of numerous matching minutiae enables unambiguous identification of a document. Therefore, OCR and barcode minutiae may simply add useful data for increasing the confidence factor in identifying a document.

Of course, those skilled in the art will recognize that the teachings herein promote identification of documents throughout their lifecycle regardless of OCR. Since the document is recognized, identified and tracked based principally on features of the document that are an integral part of the document, there is no requirement to create unique identifiers such as barcodes, sequence numbers or other special features that exist for the purpose of uniquely identifying the document. Removal of these unique identifiers (e.g., barcodes) eliminates the cost of generating the identifier and the detrimental effect of disfiguring the document with printed matter that has nothing to do with the intended content of the document. Since the teachings as presented herein involve employment of many different document attributes (minutiae) including physical (e.g., print feature information) and structural (e.g., internal composition, textual makeup) characteristics, errors in optical character reading and barcode reading are eliminated and replaced with a robust process that utilizes many redundant matching criteria to achieve the high confidence document identification demanded by current and future document processing systems.

As another feature, the teachings presented herein need not be limited to use for identification of mail items or for use within mail processing environments. For example, consider an instance wherein a bill (paper money) processing device is operational with respect to an extractor module. In the absence of said extractor module, bill processing devices are limited to verifying bill types, the general orientation of the bill upon insertion through the device and perhaps whether the bill is a valid one. With an extractor module, however, minutiae data respective to the bill may be compiled and then processed as described before, such as to determine a match or generate a unique identification value at the present point of the bill's lifecycle. Those skilled in the art will recognize the unique implications afforded by such a capability as it pertains to tracking of bills, counterfeit detection, location detection, etc. In this light, modern day bill tracking services such a Where's George?®, which require manual processing of unique identifiers associated with a bill in question, need not be used. Practitioners of the art will recognize that this is but a single example of varying uses of the teachings.

Although the discussion above has focused largely on the methodologies, those skilled in the art will recognize that those methodologies may be embodied in specific equipment, systems or devices. Also, many of the operations described above may be carried out by processing and/or associated execution of software, firmware, or microcode operating on processors or computers of any type used to provide the functionalities of the servers, client devices and/or programmed control for the various manufacturing (mail processing) elements shown in the drawings. Additionally, code for implementing such operations may be in the form of computer instruction in any form (e.g. source code, object code, interpreted code, etc.) stored in or carried by any computer or machine readable medium.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse a trackball, etc., as represented generally by the workstation 122 in the example of FIG. 3; workstation 200 in FIG. 4; or computer 249 in FIG. 5. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network.

Program aspects of the technology may be thought of as "products" typically in the form of executable code and/or associated data that is carried on or embodied in a type of machine readable medium. Media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

As used herein, terms such as computer or machine "readable medium" refer to any medium that participates in providing instructions to a processor for execution. Such a medium may take many forms, including but not limited to, non-volatile media, volatile media, and transmission media. Non-volatile storage media include, for example, optical or magnetic disks, such as any of the storage devices in any computer(s) shown in the drawings. Volatile storage media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A method of compiling information for unique identification of one document from among a plurality of documents, the method comprising steps of:

receiving a representation of the one document;

extracting minutiae data from the representation of the document, in accordance with defined identification criteria, sufficient to uniquely identify a hardcopy of the document;

collecting metadata regarding the representation of the document; and storing the extracted minutiae data in association with the collected metadata, in a searchable database of data regarding the plurality of documents, wherein:

the extracted minutiae data comprise a plurality of features associated with text on the one document, the extracted minutiae data are not associated with human fingerprinting or a barcode and the extracted minutiae data were not added to the document specifically for the purpose of document identification, the minutiae data are selected from: word count per page or per the entire document, tab spacing, indentation lengths, margin lengths, paragraph numbers, header, location, footer location, line numbers, line spacing, character spacing, font spacing, number of characters, textual color properties, text strings, text characters, white space total area data, specific text, specific phrases and specific numbers.

2. The method of claim 1, wherein:

the received representation of the one document is a pre-print electronic representation of the document; and the step of extracting minutiae data comprising a plurality of features associated with text on the one pre-print electronic representation of the document, obtaining electronic minutiae data from the pre-print electronic representation of the document.

3. The method of claim 1, wherein:

the received representation of the one document comprises an electronic image of a hardcopy of the document; and the step of extracting minutiae data comprises obtaining hardcopy minutiae data from the hardcopy of the document.

4. The method of claim 3, further comprising:

obtaining physical characteristic minutiae data of the image of the hardcopy of the document; and including the physical characteristic minutiae data in the extracted minutiae data for the document stored in the database.

5. The method of claim 4, wherein the physical characteristics minutiae data comprise properties relating to one or more aspects of the one document selected from the group consisting of chemical, radio frequency, magnetic or microscopic properties of the document.

6. The method of claim 1, wherein the minutiae data is selected from the group consisting of:

positioning of text on a page of the one document; and defined text contained in the one document.

7. A non-transitory computer readable medium embodying a program, wherein execution of the program causes a computer to implement the method of claim 1.

8. A system configured to implement the steps of the method of claim 1.

9. A method of compiling information for recognition of a hardcopy of a document, the method comprising steps of:

collecting minutiae data of the hardcopy of the document, in accordance with defined identification criteria, sufficient to uniquely identify the hardcopy of the document, wherein the collected minutiae data was not added to the document specifically for the purpose of document identification;

comparing the collected minutiae data of the hardcopy of the document to minutiae data for a plurality of identified documents in a database; and returning a result indicating whether or not the collected minutiae data matched minutiae data of any of the documents identified in the database, wherein the collected minutiae data comprises a plurality of features associated with text on the hardcopy document, and the collected minutiae data is not associated with human fingerprinting or a barcode.

10. The method of claim 9, wherein:

the collecting step comprises extracting the minutiae data of the hardcopy of the document from an image taken of the hardcopy of the document; and the comparing step comprises comparing the minutiae data extracted from the image to corresponding minutiae data of the documents identified in the database.

11. The method of claim 10, wherein:

the collecting step further comprises obtaining physical minutiae data regarding the hardcopy of the document; and the comparing step further comprises comparing the physical minutiae data regarding the hardcopy of the document to physical minutiae data regarding the documents identified in the database.

12. The method of claim 9, wherein:

the collecting step comprises obtaining physical minutiae data regarding the hardcopy of the document; and the comparing step comprises comparing the physical minutiae data regarding the hardcopy of the document to physical minutiae data regarding the documents identified in the database.

13. The method of claim 9, wherein upon the result indicating a match of the collected minutiae data to minutiae data of one of the documents identified in the database, the method further comprises:

displaying metadata associated with the image of the hardcopy of the document or metadata associated with the one document identified in the database.

14. The method of claim 9, wherein upon the result indicating a match of the collected minutiae data to minutiae data of one of the documents identified in the database, the method further comprises:

comparing the metadata associated with the image of the hardcopy of the document to metadata associated with the one document identified in the database, and when the metadatas differ, updating the metadata associated with the one document identified in the database in accordance with the metadata associated with the image of the hardcopy of the document.

15. The method of claim 9, further comprising controlling at least one operation of processing of the hardcopy of the document responsive to the result.

16. The method of claim 9, wherein the collected minutiae data comprise properties relating to one or more aspects of the hardcopy of the document selected from the group consisting of chemical, radio frequency, magnetic or microscopic properties of the hardcopy of the document.

17. A non-transitory computer readable medium embodying a program, wherein execution of the program causes a computer to implement the method of claim 9.

18. A system configured to implement the steps of the method of claim 9.

19. The method of claim 9, wherein the minutiae data are selected from: word count per page or per the entire document, tab spacing, indentation lengths, margin lengths, paragraph numbers, header, location, footer location, line numbers, line spacing, character spacing, font spacing, number of characters, textual color properties, text strings, text characters, white space total area data, specific text, specific phrases and specific numbers.

20. A method of compiling information for authenticating a hardcopy of a document, the method comprising steps of:

collecting both physical minutiae data regarding the hardcopy of the document and image minutiae data extracted from an image of the hardcopy of the document, in accordance with defined identification criteria, sufficient to uniquely identify the hardcopy of the document, wherein the physical minutiae data and image minutiae data were not added to the document specifically for the purpose of document identification;

comparing the collected image and physical minutiae data of the hardcopy of the document to corresponding minutiae data for a plurality of identified documents in a database; and returning an authentication result indicating whether or not the collected minutiae data matched minutiae data of any of the documents identified in the database, wherein the collected image minutiae data comprises a plurality of features associated with text on the image of the hardcopy document, the collected image data is not associated with human fingerprinting or a barcode.

21. The method of claim 20, wherein the image minutiae data is selected from the group consisting of: font of text used on the document; positioning of text on a page of the document; and defined text contained in the document.

22. The method of claim 20, wherein the physical minutiae data includes properties relating to one or more aspects of the hard copy of the document selected from the group consisting of chemical, radio frequency, magnetic or microscopic properties.

23. The method of claim 20, wherein upon the authentication result indicating a match of the collected minutiae data to minutiae data of one of the documents identified in the database, the method further comprises:

displaying metadata associated with the image of the hardcopy of the document or metadata associated with the document identified in the database.

24. The method of claim 20, further comprising controlling at least one operation of processing of the hardcopy of the document responsive to the authentication result.

25. The method of claim 20, wherein the image minutiae data are selected from: word count per page or per the entire document, tab spacing, indentation lengths, margin lengths, paragraph numbers, header, location, footer location, line numbers, line spacing, character spacing, font spacing, number of characters, textual color properties, text strings, text characters, white space total area data, specific text, specific phrases and specific numbers.

* * * * *